US012607235B2

(12) United States Patent
Komukai et al.

(10) Patent No.: US 12,607,235 B2
(45) **Date of Patent: \*Apr. 21, 2026**

(54) CLUTCH DEVICE, MOTORCYCLE, AND METHOD FOR PRODUCING PRESSURE PLATE

(71) Applicant: Kabushiki Kaisha F.C.C., Hamamatsu (JP)

(72) Inventors: Jun Komukai, Hamamatsu (JP); Satoshi Ota, Hamamatsu (JP); Yasunori Higashi, Hamamatsu (JP); Makoto Kambara, Hamamatsu (JP)

(73) Assignee: KABUSHIKI KAISHA F.C.C., Shizuoka (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 19/100,233

(22) PCT Filed: Sep. 12, 2023

(86) PCT No.: PCT/JP2023/033202
§ 371 (c)(1),
(2) Date: Jun. 2, 2025

(87) PCT Pub. No.: WO2024/058174

PCT Pub. Date: Mar. 21, 2024

(65) Prior Publication Data

US 2025/0283514 A1      Sep. 11, 2025

(30) Foreign Application Priority Data

Sep. 13, 2022    (JP) ................................. 2022-145634
Dec. 21, 2022    (JP) ................................. 2022-204201

(51) Int. Cl.
    *F16D 13/56*        (2006.01)
    *B22D 17/00*        (2006.01)
    (Continued)

(52) U.S. Cl.
    CPC ........... *F16D 13/56* (2013.01); *B22D 17/002* (2013.01); *B22D 17/08* (2013.01); *B22D 17/26* (2013.01);
    (Continued)

(58) Field of Classification Search
    CPC .... F16D 13/52–13/56; F16D 2013/565; F16D 13/70; F16D 13/71; F16D 23/12;
    (Continued)

(56) References Cited

U.S. PATENT DOCUMENTS 11,933,369 B1 *  3/2024  Komukai ............. B22D 17/002
2006/0096077 A1    5/2006  Kataoka et al.
                   (Continued)

FOREIGN PATENT DOCUMENTS

CN        1773136 A      5/2006
CN        101398038 A    4/2009
                   (Continued)

OTHER PUBLICATIONS

Official Communication issued in Japanese Patent Application No. 2022-204201, mailed on Mar. 14, 2023, 4 pages.
(Continued)

*Primary Examiner* — Richard M Lorence
(74) *Attorney, Agent, or Firm* — Keating & Bennett, LLP

(57)        ABSTRACT

A clutch device includes a pressure plate movable toward or away from a clutch center and rotatable with respect to the clutch center. The pressure plate includes a flange extending radially outward from an outer circumferential edge of a body, pressure-side fitting teeth projecting in a first direction from a front surface of the flange, holding input-side rotating plates and a portion of output-side rotating plates being arranged in a circumferential direction, a body-side recessed portion recessed in the first direction from a second direction-side surface of the body, and a flange-side recessed
(Continued)

portion recessed in the first direction from a back surface of the flange. As seen in an axial direction of an output shaft, the flange-side recessed portion at least partially overlaps one of the pressure-side fitting teeth.

11 Claims, 11 Drawing Sheets

(51) Int. Cl.

| | | |
|---|---|---|
| *B22D 17/08* | (2006.01) | |
| *B22D 17/26* | (2006.01) | |
| *B22D 21/00* | (2006.01) | |
| *B22D 25/02* | (2006.01) | |
| *B22D 29/00* | (2006.01) | |
| *B22D 30/00* | (2006.01) | |
| *F16D 13/52* | (2006.01) | |
| *F16D 13/54* | (2006.01) | |
| *F16D 13/70* | (2006.01) | |
| *F16D 23/12* | (2006.01) | |

(52) U.S. Cl.
 CPC ........... *B22D 21/007* (2013.01); *B22D 25/02* (2013.01); *B22D 29/00* (2013.01); *B22D 30/00* (2013.01); *F16D 13/54* (2013.01); *F16D 13/70* (2013.01); *F16D 23/12* (2013.01); *F16D 13/52* (2013.01); *F16D 2013/565* (2013.01); *F16D 2023/123* (2013.01); *F16D 2250/0007* (2013.01)

(58) Field of Classification Search
 CPC ....... F16D 2023/123; F16D 2250/0007; B62D 17/00–17/32; B62D 29/00–29/08; B22D 17/00–17/32; B22D 29/00–29/08; B22D 21/00–21/06; B22D 25/00–25/08; B22D 30/00
 See application file for complete search history.

(56) References Cited

U.S. PATENT DOCUMENTS

| | | | |
|---|---|---|---|
| 2008/0308382 A1 | 12/2008 | Kataoka et al. | |
| 2009/0078526 A1 | 3/2009 | Kawatsu et al. | |
| 2011/0198188 A1 | 8/2011 | Kuwashima | |
| 2014/0326570 A1* | 11/2014 | Isobe ..................... | F16D 13/54 |
| | | | 192/70.11 |
| 2015/0041275 A1 | 2/2015 | Satou et al. | |
| 2017/0159724 A1 | 6/2017 | Imanishi | |
| 2017/0159725 A1 | 6/2017 | Imanishi | |
| 2020/0158194 A1 | 5/2020 | Kataoka et al. | |
| 2020/0232520 A1 | 7/2020 | Ozawa et al. | |
| 2021/0310523 A1 | 10/2021 | Matsuyoshi | |
| 2024/0084859 A1 | 3/2024 | Komukai et al. | |

FOREIGN PATENT DOCUMENTS

| | | | |
|---|---|---|---|
| CN | 102155501 A | 8/2011 | |
| CN | 103814229 A | 5/2014 | |
| CN | 106870588 A | 6/2017 | |
| CN | 111094778 A | 5/2020 | |
| CN | 111156262 A | 5/2020 | |
| CN | 113494543 A | 10/2021 | |
| EP | 0949435 A2 | 10/1999 | |
| JP | H07232390 A | 9/1995 | |
| JP | 2007177890 A | 7/2007 | |
| JP | 2012125815 A | 7/2012 | |
| JP | 6894792 B2 | 6/2021 | |
| JP | 2021089017 A | 6/2021 | |
| JP | 2021162113 A | 10/2021 | |
| JP | 7403620 B1 | 12/2023 | |

OTHER PUBLICATIONS

Official Communication issued in Japanese Patent Application No. 2022-204201, mailed on Aug. 1, 2023, 3 pages.
Official Communication issued in Japanese Patent Application No. 2022-204201, mailed on Dec. 5, 2023, 3 pages.
International Search Report in PCT/JP2023/033202, mailed Nov. 28, 2023, 2 pages.
Komukai et al., "Clutch Device, Motorcycle, and Method for Producing Pressure Plate", U.S. Appl. No. 18/243,226, filed Sep. 7, 2023.

* cited by examiner

CLUTCH DEVICE, MOTORCYCLE, AND METHOD FOR PRODUCING PRESSURE PLATE

BACKGROUND OF THE INVENTION

1. Field of the Invention

The present invention relates to clutch devices, motorcycles, and methods for producing pressure plates, and more particularly, clutch devices each allowing or blocking, as needed, transfer of a rotation driving force of an input shaft, rotationally drivable by a prime mover such as an engine or the like, to an output shaft, motorcycles including the same, and methods for producing pressure plates usable in the clutch devices.

2. Description of the Related Art

Conventional vehicles such as motorcycles or the like include clutch devices. A clutch device is located between an engine and a drive wheel, and allows or blocks transfer of a rotation driving force of the engine to the drive wheel. The clutch device generally includes a plurality of input-side rotating plates rotatable by a rotation driving force of the engine and a plurality of output-side rotating plates connected with an output shaft that transfers the rotation driving force to the drive wheel. The input-side rotating plates and the output-side rotating plates are alternately arranged in a stacking direction, and the input-side rotating plates and the output-side rotating plates are brought into pressure contact with each other or are separated from each other so that transfer of a rotation driving force is allowed or blocked.

Japanese Patent No. 6894792, for example, discloses a clutch device including a clutch center (clutch member) holding output-side rotating plates (driven clutch plates) and a pressure plate (pressure member) movable toward or away from the clutch center. The pressure plate is configured to be capable of pressing the input-side rotating plates and the output-side rotating plates. In this manner, the clutch device includes an assembly of the clutch center and the pressure plate.

In the clutch device of Japanese Patent No. 6894792, the clutch center includes center-side (outer fitting teeth circumferential wall having a spline formed therein) as a member holding the output-side rotating plates, and the pressure plate includes pressure-side fitting teeth also as a member holding the output-side rotating plates. The clutch device is configured such that in a state where the clutch center and the pressure plate are assembled together, the center-side fitting teeth and the pressure-side fitting teeth overlap each other in a radial direction.

SUMMARY OF THE INVENTION

Such a clutch device including the clutch center and the pressure plate assembled together tends to be relatively heavy because the clutch device holds a plurality of input-side rotating plates and a plurality of output-side rotating plates. Therefore, a vehicle including the clutch device such as a motorcycle or the like may also be heavy. In consideration of the running performance (e.g., gas mileage), it is preferred that the clutch device is lightweight. However, the clutch device also needs to have a certain level of rigidity. Example embodiments of the present invention provide clutch devices each including a pressure plate that is sufficiently rigid and lightweight, motorcycles including the same, and methods for producing the pressure plates.

A clutch device according to an example embodiment of the present invention is a clutch device allowing or blocking transfer of a rotation driving force of an input shaft to an output shaft. The clutch device includes a clutch center housed in a clutch housing holding a plurality of input-side rotating plates rotationally drivable by rotational driving of the input shaft, the clutch center holding a portion of a plurality of output-side rotating plates alternately arranged with the input-side rotating plates, the clutch center being rotationally drivable together with the output shaft, and a pressure plate movable toward or away from the clutch center and rotatable with respect to the clutch center, the pressure plate being capable of pressing the input-side rotating plates and the output-side rotating plates. The pressure plate includes a body, a flange extending radially outward from an outer circumferential edge of the body, a plurality of pressure-side fitting teeth projecting in a first direction from a first direction-side surface of the flange, holding another portion of the plurality of output-side rotating plates, and being arranged in a circumferential direction, where the first direction is a direction in which the pressure plate moves toward the clutch center, and a second direction is a direction in which the pressure plate moves away from the clutch center, a plurality of pressure-side cam portions provided in the body and each including at least one of a pressure-side assist cam surface and a pressure-side slipper cam surface, the pressure-side assist cam surface being operable to generate a force in a direction from the pressure plate toward the clutch center in order to increase a pressing force between the input-side rotating plates and the output-side rotating plates when the pressure plate rotates with respect to the clutch center, and the pressure-side slipper cam surface separating the pressure plate from the clutch center in order to decrease the pressing force between the input-side rotating plates and the output-side rotating plates when the pressure plate rotates with respect to the clutch center, and a body-side recessed portion recessed in the first direction from a second direction-side surface of the body. As seen in an axial direction of the output shaft, the body-side recessed portion at least partially overlaps one of the pressure-side slipper cam surfaces.

A method for producing a pressure plate according to an example embodiment of the present invention is a method for producing a pressure plate including a body, a flange extending radially outward from an outer circumferential edge of the body, a plurality of pressure-side fitting teeth projecting from a front surface of the flange, holding output-side rotating plates, and being arranged in a circumferential direction, a plurality of pressure-side cam portions provided in the body and each including at least one of a pressure-side assist cam surface and a pressure-side slipper cam surface, the pressure-side assist cam surface being operable to generate a force in a direction from the pressure plate toward the clutch center in order to increase a pressing force between input-side rotating plates and the output-side rotating plates when the pressure plate rotates with respect to the clutch center, and the pressure-side slipper cam surface separating the pressure plate from the clutch center in order to decrease the pressing force between the input-side rotating plates and the output-side rotating plates, when the pressure plate rotates with respect to the clutch center, and a body-side recessed portion provided in a back surface of the body. The method includes preparing a mold including a fixed mold and a movable mold capable of approaching or separating from the fixed mold, causing the movable mold to approach the fixed mold to close the mold, filling a molding space formed by the movable mold and the fixed mold with a metal material, cooling and solidifying the metal material to form the pressure plate by molding and then separating the movable mold from the fixed mold to open the mold, and detaching the pressure plate from the movable mold by pushing a core pin against a portion of the back surface of the body of the pressure plate fixed to the movable mold, which overlaps one of the pressure-side cam portions as seen in a mold moving direction to detach the pressure plate from the movable mold, the mold moving direction being a direction in which the movable mold is moved with respect to the fixed mold.

Example embodiments of the present invention provide clutch devices each including a pressure plate that is sufficiently rigid and lightweight, and motorcycles including the same, and methods for producing the pressure plates.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Clutch devices according to example embodiments of the present invention will be described hereinafter with reference to the drawings. The example embodiments described herein are, of course, not intended to particularly limit the present invention. Elements and features having the same functions are denoted by the same reference signs, and description for the same elements and features will not be repeated or will be simplified as appropriate.

Figure 1:
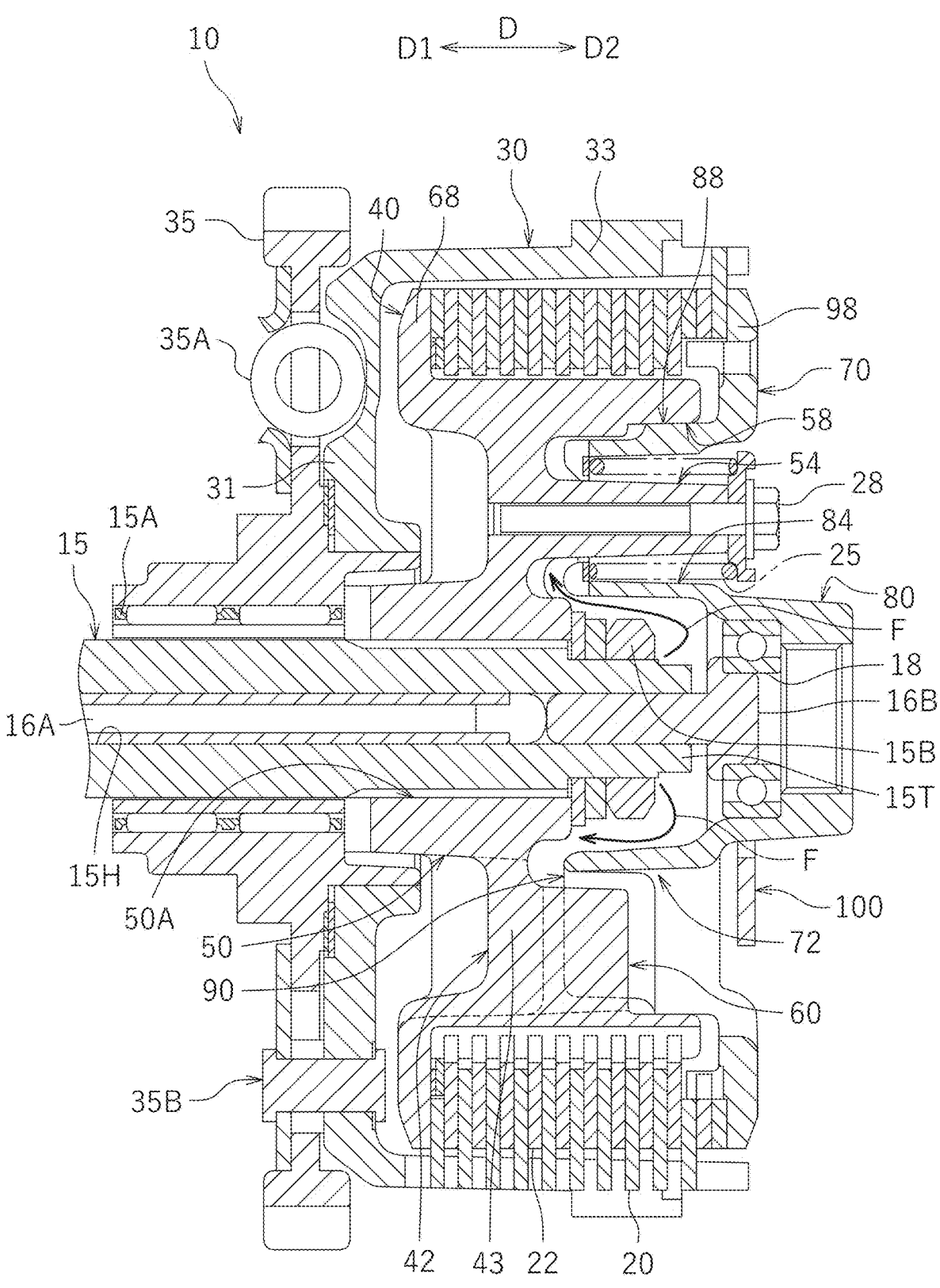
FIG. 1 is a cross-sectional view of a clutch device according to an example embodiment of the present invention.

FIG. 1 is a cross-sectional view of a clutch device 10 according to this example embodiment. The clutch device 10 is provided in a vehicle such as a motorcycle or the like, for example. The clutch device 10 allows or blocks transfer of a rotation driving force of an input shaft (crankshaft) of an engine of the motorcycle to an output shaft 15, for example. The clutch device 10 allows or blocks transfer of a rotation driving force of the input shaft to a drive wheel (rear wheel) through the output shaft 15. The clutch device 10 is located between the engine and a transmission.

In the following description, a direction in which a pressure plate 70 and a clutch center 40 of the clutch device 10 are aligned will be referred to as a direction D, a direction in which the pressure plate 70 moves toward the clutch center 40 will be referred to as a first direction D1, and a direction in which the pressure plate 70 moves away from the clutch center 40 will be referred to as a second direction D2. A circumferential direction of the clutch center 40 and the pressure plate 70 will be referred to as a circumferential direction S. Regarding two of pressure-side cam portions 90 located along the circumferential direction S, a circumferential direction from one pressure-side cam portion 90 to the other pressure-side cam portion 90 will be referred to as a first circumferential direction S1 (see FIG. 5), and a circumferential direction from the other pressure-side cam portion 90 to the one pressure-side cam portion 90 will be referred to as a second circumferential direction S2 (see FIG. 5). In this example embodiment, an axial direction of the output shaft 15, an axial direction of a clutch housing 30, an axial direction of the clutch center 40, and an axial direction of the pressure plate 70 are the same as the direction D. The pressure plate 70 and the clutch center 40 rotate in the first circumferential direction S1. It should be noted that the directions described above are defined simply for convenience of description, and are not intended to limit the state of installation of the clutch device 10 and do not limit the present invention.

As illustrated in FIG. 1, the output shaft 15 is a hollow shaft. One end of the output shaft 15 rotatably supports an input gear 35 described below and the clutch housing 30 through a needle bearing 15A. The output shaft 15 securely supports the clutch center 40 through a nut 15B. That is, the output shaft 15 rotates together with the clutch center 40. The other end of the output shaft 15 is coupled with a transmission (not shown) of a motorcycle, for example.

As illustrated in FIG. 1, the output shaft 15 includes, in a hollow portion 15H thereof, a push rod 16A and a push body 16B adjacent to the push rod 16A. The hollow portion 15H serves as a channel of clutch oil. Clutch oil flows in the output shaft 15, that is, in the hollow portion 15H. The push rod 16A and the push body 16B are slidable in the hollow portion 15H of the output shaft 15. The push rod 16A has one end (left end in FIG. 1) coupled with a clutch operation lever (not shown) of the motorcycle, and slides in the hollow portion 15H by an operation made on the clutch operation lever and presses the push body 16B in the second direction D2. A portion of the push body 16B projects outward of the output shaft 15 (in the second direction D2 in this example embodiment) and is coupled with a release bearing 18 provided in the pressure plate 70. The push rod 16A and the push body 16B are thinner than the inner diameter of the hollow portion 15H so that flowability of clutch oil is obtained in the hollow portion 15H. The clutch housing 30 is made of an aluminum alloy. The clutch housing 30 has a bottomed cylindrical shape. As illustrated in FIG. 1, the clutch housing 30 includes a bottom wall 31 having a substantially circular shape, and a side wall 33 extending in the second direction D2 from an edge of the bottom wall 31. The clutch housing 30 holds a plurality of input-side rotating plates 20.

As illustrated in FIG. 1, the input gear 35 is located on the bottom wall 31 of the clutch housing 30. The input gear 35 is secured to the bottom wall 31 by a rivet 35B through a torque damper 35A. The input gear 35 meshes with a driving gear (not shown) that rotates by rotational driving of the input shaft of the engine. The input gear 35 is rotationally drivable together with the clutch housing 30, independently of the output shaft 15.

The input-side rotating plates 20 are rotationally drivable by rotational driving of the input shaft. As illustrated in FIG. 1, the input-side rotating plates 20 are held on an inner circumferential surface of the side wall 33 of the clutch housing 30. The input-side rotating plates 20 are held by the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against output-side rotating plates 22. The input-side rotating plates 20 are ring-shaped flat plates. Each of the input-side rotating plates 20 is molded by punching a thin plate of a steel plate cold commercial (SPCC) material into a ring shape. Friction members (not shown) of a plurality of paper sheets are attached to front and back surfaces of each of the input-side rotating plates 20. A groove with a depth of several micrometers to several tens of micrometers is positioned between the friction members to hold clutch oil.

As illustrated in FIG. 1, the clutch center 40 is housed in the clutch housing 30. The clutch center 40 and the clutch housing 30 are concentrically located. The clutch center 40 includes a cylindrical body 42 and a flange 68 extending radially outward from an outer circumferential edge of the body 42. The clutch center 40 holds the plurality of output-side rotating plates 22 arranged alternately with the input-side rotating plates 20 in the direction D. The clutch center 40 is rotationally drivable together with the output shaft 15.

Figure 2:
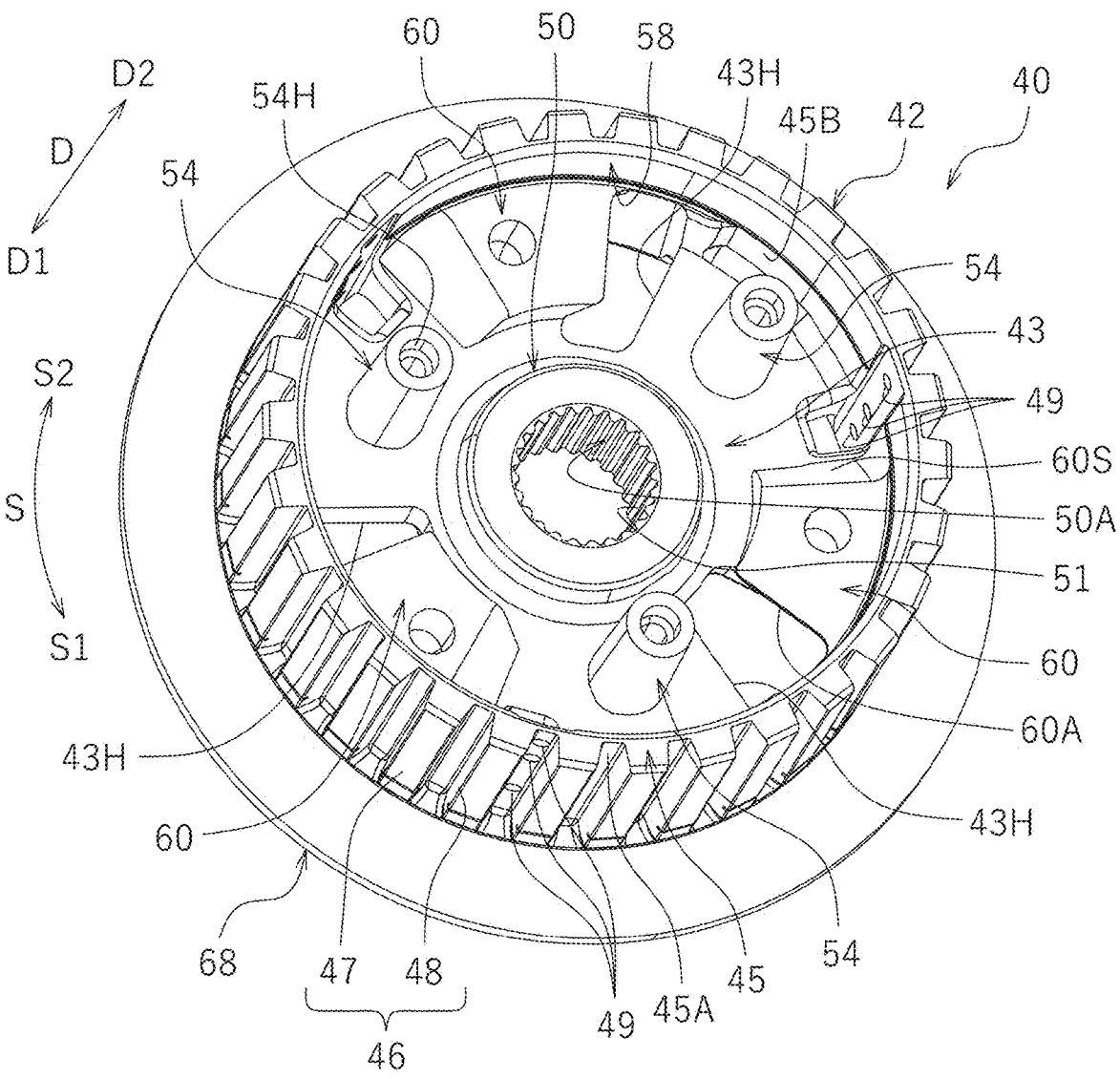
FIG. 2 is a perspective view of a clutch center according to an example embodiment of the present invention.

As illustrated in FIG. 2, the body 42 includes a ring-shaped base wall 43, an outer circumferential wall 45 located radially outward of the base wall 43 and extending in the second direction D2, an output shaft holding portion 50 located at the center of the base wall 43, a plurality of center-side cam portions 60 connected with the base wall 43 and the outer circumferential wall 45, and a center-side fitting portion 58.

The output shaft holding portion 50 has a cylindrical shape. The output shaft holding portion 50 has an insertion hole 51, in which the output shaft 15 is inserted and spline-fitted. The insertion hole 51 penetrates the base wall 43. An inner circumferential surface 50A, of the output shaft holding portion 50, defining the insertion hole 51 has a plurality of spline grooves formed along an axial direction thereof. The output shaft 15 is coupled with the output shaft holding portion 50.

As illustrated in FIG. 2, the outer circumferential wall 45 of the clutch center 40 is located radially outward of the output shaft holding portion 50. An outer circumferential surface 45A of the outer circumferential wall 45 includes a spline fitting portion 46. The spline fitting portion 46 includes a plurality of center-side fitting teeth 47 extending in the axial direction of the clutch center 40 along the outer circumferential surface 45A of the outer circumferential wall 45, a plurality of spline grooves 48 each positioned between adjacent ones of the center-side fitting teeth 47 and extending in the axial direction of the clutch center 40, and oil flow holes 49. The center-side fitting teeth 47 hold the output-side rotating plates 22. The plurality of center-side fitting teeth 47 are arranged in the circumferential direction S. The plurality of center-side fitting teeth 47 are arranged at equal or substantially equal intervals in the circumferential direction S. The plurality of center-side fitting teeth 47 have the same shape or substantially the same shape. The center-side fitting teeth 47 project radially outward from the outer circumferential surface 45A of the outer circumferential wall 45. The number of the center-side fitting teeth 47 may be a multiple of the number of the center-side cam portions 60. In this example embodiment, the center-side cam portions 60 are provided in the number of three, and the center-side fitting teeth 47 are provided in the number of 30, as described below. The number of the center-side fitting teeth 47 does not need to be a multiple of the number of the center-side cam portions 60. The oil flow holes 49 penetrate the outer circumferential wall 45 in the radial direction. The oil flow holes 49 are positioned between adjacent ones of the center-side fitting teeth 47. That is, the oil flow holes 49 are formed in the spline grooves 48. The oil flow holes 49 are positioned to the side of the center-side cam portions 60. The oil flow holes 49 are positioned to the side of center-side slipper cam surfaces 60S of the center-side cam portions 60. The oil flow holes 49 are positioned ahead of the center-side slipper cam surfaces 60S in the first circumferential direction S1. The oil flow holes 49 are positioned ahead of bosses 54 described below in the second circumferential direction S2. In this example embodiment, three oil flow holes 49 are provided at each of three positions in the circumferential direction S of the outer circumferential wall 45. The oil flow holes 49 are located at equal or substantially equal intervals in the circumferential direction S. The oil flow holes 49 cause the inside and the outside of the clutch center 40 to communicate with each other. The oil flow holes 49 allow clutch oil, flowing out from the output shaft 15 into the clutch center 40, to flow to the outside of the clutch center 40. In this example embodiment, the oil flow holes 49 allow the clutch oil, flowing on an inner circumferential surface 45B of the outer circumferential wall 45, to flow to the outside of the clutch center 40. At least a portion of the oil flow holes 49 is provided at a position facing a pressure-side fitting portion 88 described below.

The output-side rotating plates 22 are held by the spline fitting portion 46 of the clutch center 40 and the pressure plate 70. A portion of the output-side rotating plates 22 is held by the center-side fitting teeth 47 and the spline grooves 48 of the clutch center 40 by spline fitting. Another portion of the output-side rotating plates 22 is held by pressure-side fitting teeth 77 (see FIG. 4; described below) of the pressure plate 70. The output-side rotating plates 22 are displaceable along the axial direction of the clutch center 40. The output-side rotating plates 22 are rotatable together with clutch center 40.

The output-side rotating plates 22 are pushed against the input-side rotating plates 20. The output-side rotating plates 22 are ring-shaped flat plates. Each of the output-side rotating plates 22 is molded by punching a thin plate of an SPCC material into a ring shape. Front and back surfaces of each of the output-side rotating plates 22 have grooves with depths of several micrometers to several tens of micrometers to hold clutch oil. The front and back surfaces of each of the output-side rotating plates 22 are subjected to a surface hardening treatment to enhance abrasion resistance thereof. The friction members, described above as being provided on the input-side rotating plates 20, may be provided on the output-side rotating plates 22 instead of on the input-side rotating plates 20, or may be provided on both the input-side rotating plates 20 and the output-side rotating plates 22.

Figure 3:
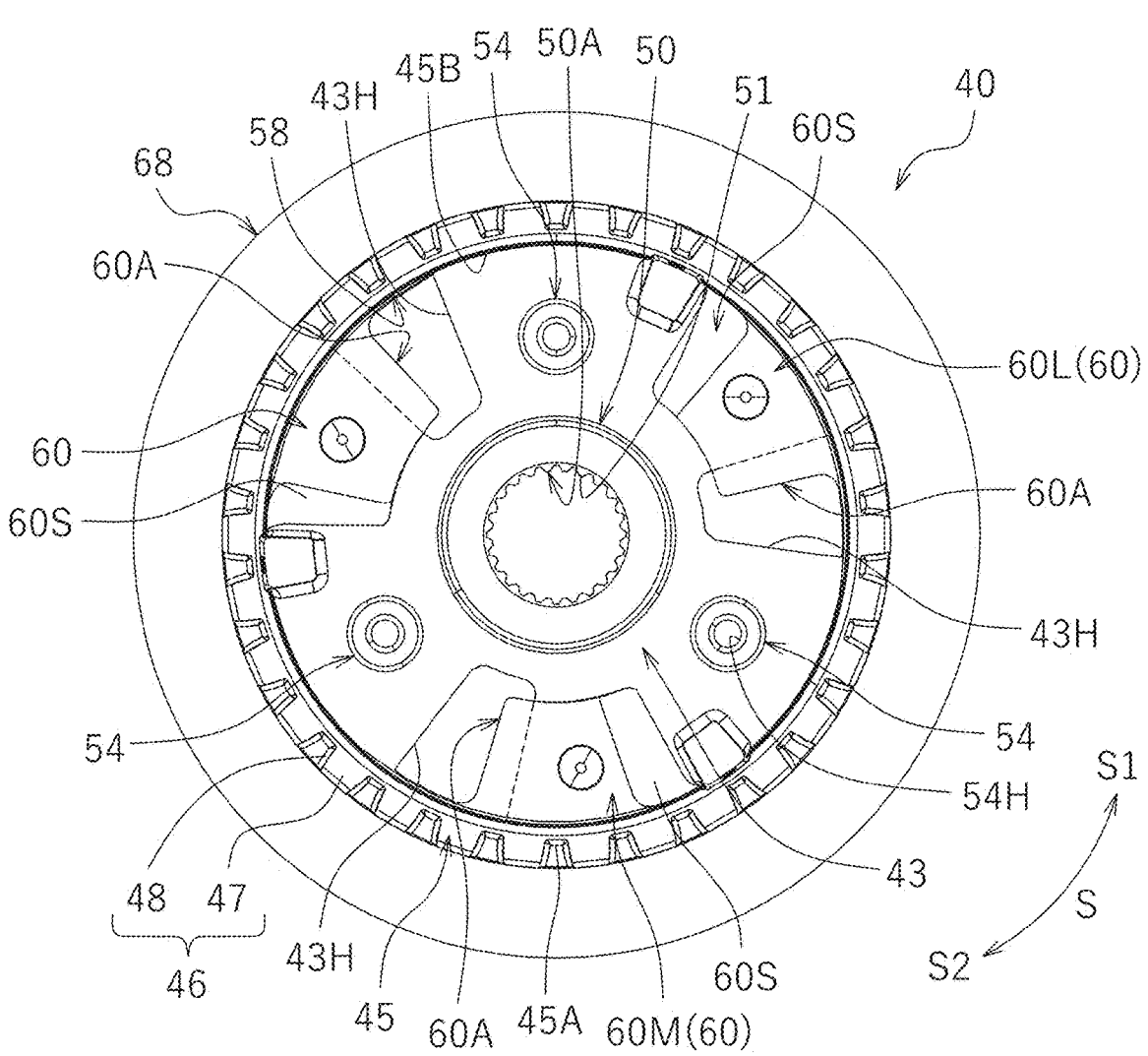
FIG. 3 is a plan view of the clutch center according to an example embodiment of the present invention.

Each of the center-side cam portions 60 preferably has a truncated quadrangular pyramid shape including a cam surface with a slope acting as an Assist & Slipper (registered trademark) mechanism. The cam surface as the Assist & Slipper (registered trademark) mechanism generates an assist torque as a force increasing a pressing force (contact pressure force) between the input-side rotating plates 20 and the output-side rotating plates 22 or a slipper torque as a force separating the input-side rotating plates 20 and the output-side rotating plates 22 from each other on an early stage and shifting these plates into a half-clutch state. The center-side cam portions 60 project ahead of the base wall 43 in the second direction D2. As illustrated in FIG. 3, the center-side cam portions 60 are arranged at equal or substantially equal intervals in the circumferential direction S of the clutch center 40. In this example embodiment, the clutch center 40 includes three center-side cam portions 60, but the number of the center-side cam portions 60 is not limited to three.

As illustrated in FIG. 3, the center-side cam portions 60 are located radially outward of the output shaft holding portion 50. Each of the center-side cam portions 60 includes a center-side assist cam surface 60A and the center-side slipper cam surface 60S. The center-side assist cam surface 60A is configured to generate a force in a direction from the pressure plate 70 toward the clutch center 40 (in such a direction as to cause the pressure plate 70 to approach the clutch center 40), in order to increase a pressing force (contact pressure force) between the input-side rotating plates 20 and the output-side rotating plates 22, when the clutch center 40 rotates with respect to the pressure plate 70. In this example embodiment, when this force is generated, the position of the pressure plate 70 with respect to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40, in order to decrease the pressing force (contact pressure force) between the input-side rotating plates 20 and the output-side rotating plates 22, when the clutch center 40 rotates with respect to the pressure plate 70. Regarding two of the center-side cam portions 60 adjacent to each other in the circumferential direction S, the center-side assist cam surface 60A of one center-side cam portion 60L and the center-side slipper cam surface 60S of the other center-side cam portion 60M are opposed to each other in the circumferential direction S.

As illustrated in FIG. 2, the clutch center 40 includes plurality of (for example, three in this example embodiment) bosses 54. The bosses 54 support the pressure plate 70. The plurality of bosses 54 are arranged at equal or substantially equal intervals in the circumferential direction S. Each of the bosses 54 has a cylindrical shape. The bosses 54 are located radially outward of the output shaft holding portion 50. The bosses 54 extend toward the pressure plate 70 (i.e., in the second direction D2). The bosses 54 are located on the base wall 43. The bosses 54 each have a screw hole 54H, into which a bolt 28 (see FIG. 1) is inserted. The screw hole 54H extends in the axial direction of the clutch center 40.

As illustrated in FIGS. 2 and 3, the clutch center 40 has center-side cam holes 43H penetrating a portion of the base wall 43. The center-side cam holes 43H penetrate the base wall 43 in the direction D. Each of the center-side cam holes 43H extends from a position to the side of the output shaft holding portion 50 to the outer circumferential wall 45. The center-side cam hole 43H is positioned between the center-side assist cam surface 60A of the center-side cam portion 60 and the boss 54. As seen in the axial direction of the clutch center 40, the center-side assist cam surface 60A overlaps a portion of the center-side cam hole 43H.

As illustrated in FIG. 2, the center-side fitting portion 58 is located radially outward of the output shaft holding portion 50. The center-side fitting portion 58 is located radially outward of the center-side cam portions 60. The center-side fitting portion 58 is located ahead of the center-side cam portions 60 in the second direction D2. The center-side fitting portion 58 is positioned on the inner circumferential surface 45B of the outer circumferential wall 45. The center-side fitting portion 58 is configured to be slidably outserted onto the pressure-side fitting portion 88 (see FIG. 4) described below. The inner diameter of the center-side fitting portion 58 has a fitting tolerance allowing distribution of clutch oil flowing out of a distal end 15T (see FIG. 1) of the output shaft 15 to the pressure-side fitting portion 88. That is, a gap is positioned between the center-side fitting portion 58 and the pressure-side fitting portion 88 described below. In this example embodiment, for example, the center-side fitting portion 58 has an inner diameter larger than the outer diameter of the pressure-side fitting portion 88 by about 0.1 mm. This dimensional tolerance between the inner diameter of the center-side fitting portion 58 and the outer diameter of the pressure-side fitting portion 88 is appropriately set in accordance with the amount of clutch oil intended to be distributed, and is, for example, about 0.1 mm or more and about 0.5 mm or less.

As illustrated in FIG. 1, the pressure plate 70 is movable toward or away from the clutch center 40 and rotatable with respect to the clutch center 40. The pressure plate 70 is configured to be capable of pressing the input-side rotating plates 20 and the output-side rotating plates 22. The pressure plate 70 is located concentrically with the clutch center 40 and the clutch housing 30. The pressure plate 70 includes a body 72, and a flange 98 connected with an outer circumferential edge, on the side of the second direction D2, of the body 72 and extending radially outward. The body 72 projects ahead of the flange 98 in the first direction D1. The pressure plate 70 holds the plurality of output-side rotating plates 22 arranged alternately with the input-side rotating plates 20. The output-side rotating plates 22 are displaceable in the axial direction of the pressure plate 70. The output-side rotating plates 22 are rotatable integrally with the pressure plate 70.

Figure 4:
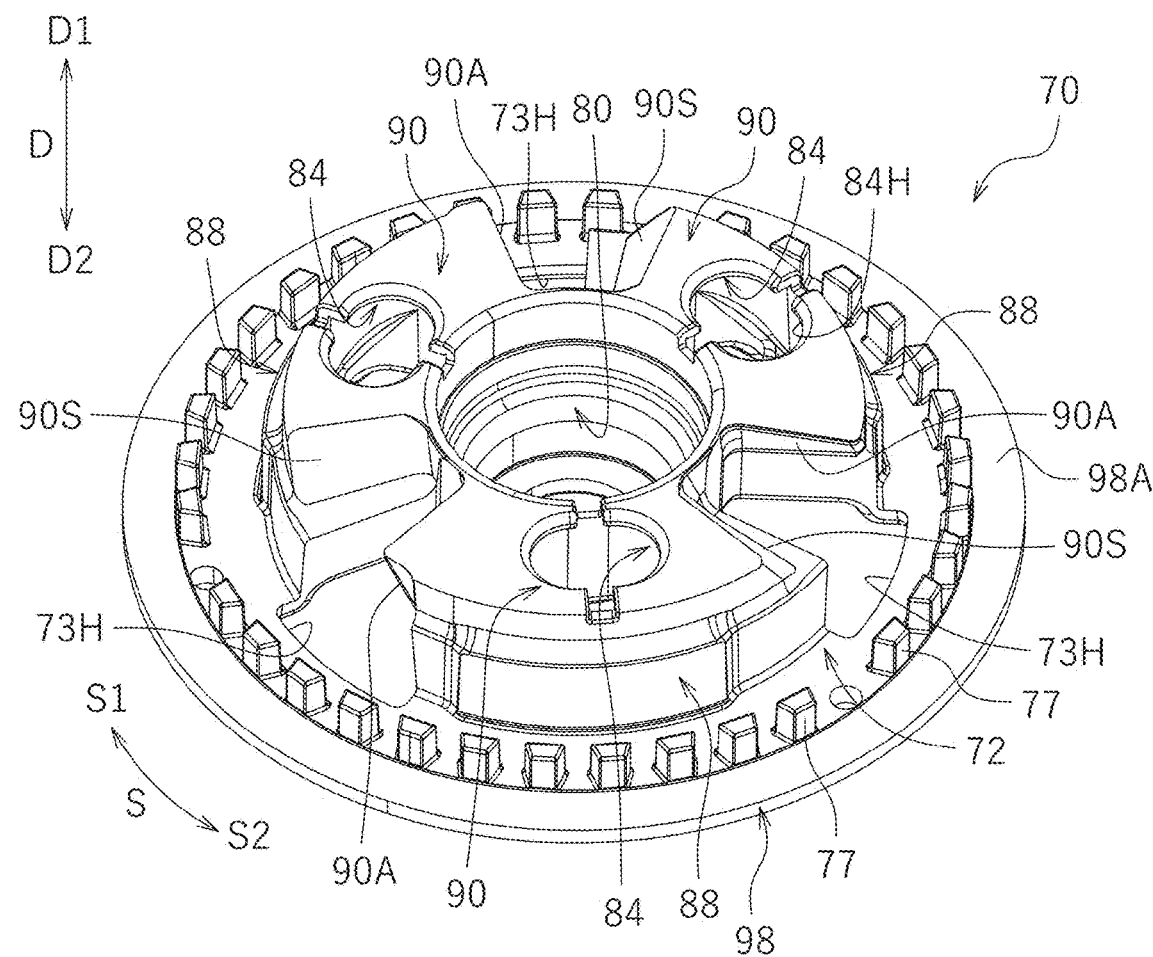
FIG. 4 is a perspective view of a pressure plate according to an example embodiment of the present invention.
Figure 6:
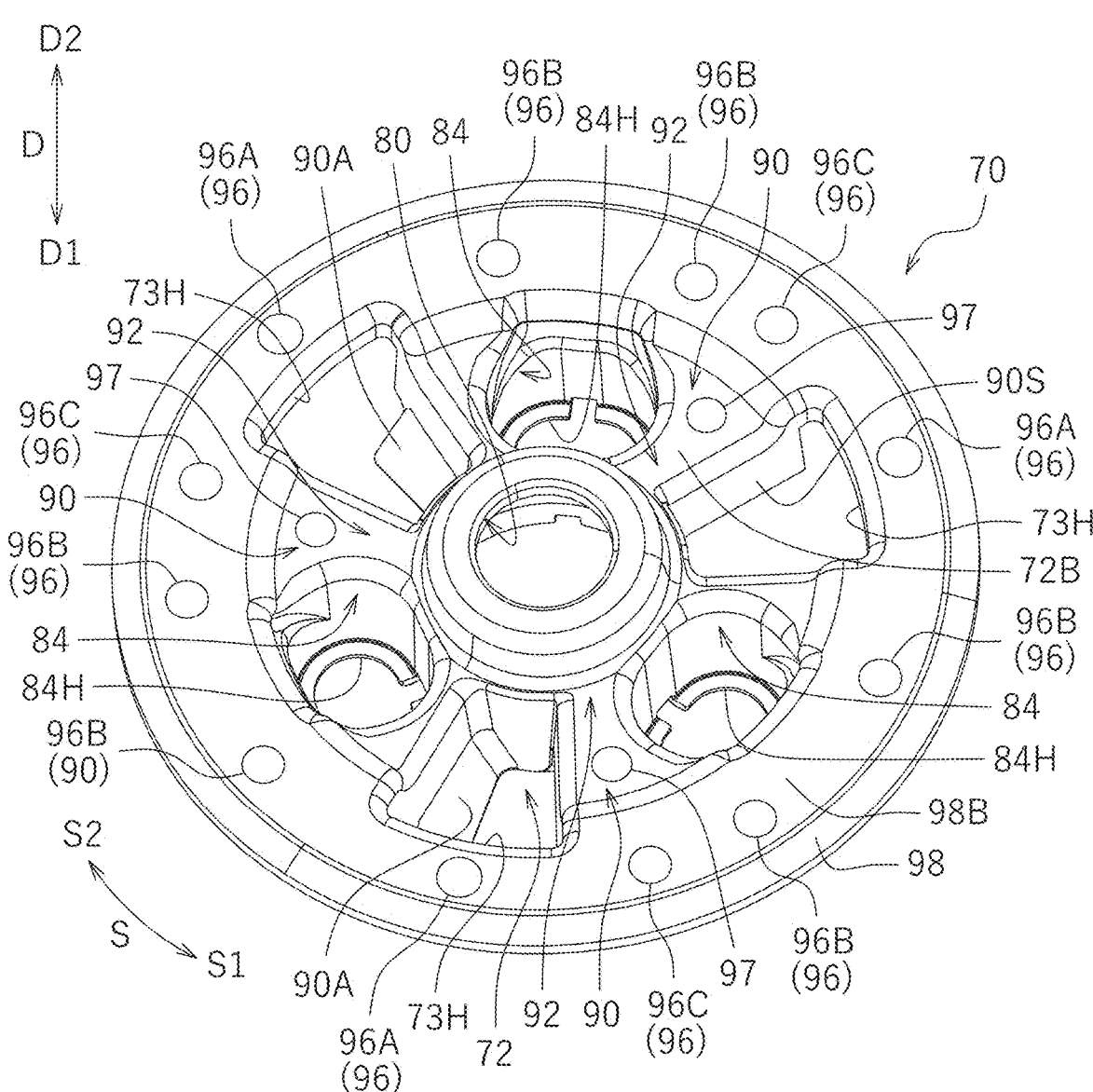
FIG. 6 is a perspective view of the pressure plate according to an example embodiment of the present invention.

As illustrated in FIG. 4, the body 72 includes a cylindrical portion 80, the plurality of pressure-side cam portions 90, the pressure-side fitting portion 88, and spring housing portions 84 (see also FIG. 6).

As illustrated in FIG. 4, the flange 98 extends radially outward from the outer circumferential edge of the body 72. In this example embodiment, the flange 98 extends radially outward from an outer circumferential edge of the pressure-side fitting portion 88. The flange 98 has a front surface 98A and a back surface 98B (see FIG. 6). The front surface 98A applies a pressing force to the input-side rotating plates 20 and the output-side rotating plates 22. The front surface 98A contacts the input-side rotating plates 20 and the output-side rotating plates 22 directly or indirectly. The front surface 98A and the flange 68 of the clutch center 40 sandwich the input-side rotating plates 20 and the output-side rotating plates 22 therebetween. The front surface 98A is an example of first direction-side surface. The back surface 98B is an example of second direction-side surface.

The cylindrical portion 80 has a cylindrical shape. The cylindrical portion 80 is integrally formed with the pressure-side cam portions 90. The cylindrical portion 80 houses the distal end 15T of the output shaft 15 (see FIG. 1). The cylindrical portion 80 houses the release bearing 18 (see FIG. 1). The cylindrical portion 80 receives a pressing force from the push body 16B. The cylindrical portion 80 receives clutch oil flowing out of the distal end 15T of the output shaft 15.

Figure 5:
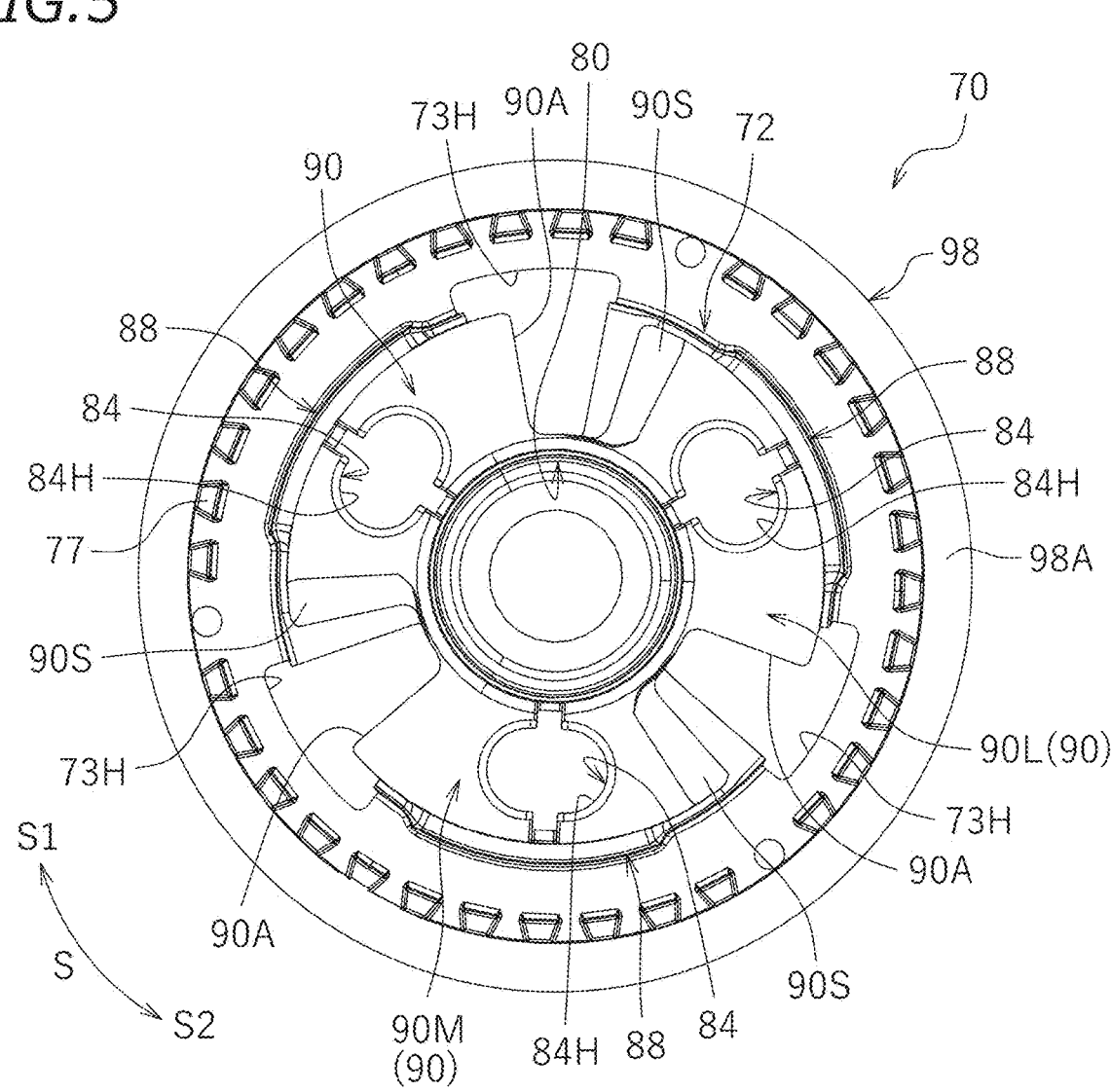
FIG. 5 is a plan view of the pressure plate according to an example embodiment of the present invention.

Each of the pressure-side cam portions 90 has a truncated quadrangular pyramid shape including a cam surface with a slope acting as an Assist & Slipper (registered trademark) mechanism. The cam surface as the Assist & Slipper (registered trademark) mechanism slides on the center-side cam portion 60 and generates an assist torque or a slipper torque. The pressure-side cam portion 90 projects ahead of the flange 98 in the first direction D1. As illustrated in FIG. 5, the pressure-side cam portions 90 are arranged at equal or substantially equal intervals in the circumferential direction S of the pressure plate 70. In this example embodiment, the pressure plate 70 includes three pressure-side cam portions 90, but the number of the pressure-side cam portions 90 is not limited to three.

As illustrated in FIG. 5, the pressure-side cam portions 90 are located radially outward of the cylindrical portion 80. Each of the pressure-side cam portions 90 includes a pressure-side assist cam surface 90A (see also FIG. 7) and a pressure-side slipper cam surface 90S. The pressure-side assist cam surface 90A is located at an end on one side in the circumferential direction S (in this example embodiment, at an end on the side of the first circumferential direction S1) of the pressure-side cam portion 90. The pressure-side slipper cam surface 90S is located at an end on the other side in the circumferential direction S (in this example embodiment, at an end on the side of the second circumferential direction S2) of the pressure-side cam portion 90. The pressure-side assist cam surface 90A is configured to be contactable with the center-side assist cam surface 60A. The pressure-side assist cam surface 90A is configured to generate a force in a direction from the pressure plate 70 toward the clutch center 40 (in such a direction as to cause the pressure plate 70 to approach the clutch center 40), in order to increase a pressing force (contact pressure force) between the input-side rotating plates 20 and the output-side rotating plates 22, when the pressure plate 70 rotates with respect to the clutch center 40. The pressure-side slipper cam surface 90S is configured to be contactable with the center-side slipper cam surface 60S. The pressure-side slipper cam surface 90S is configured to separate the pressure plate 70 from the clutch center 40, in order to decrease the pressing force (contact pressure force) between the input-side rotating plates 20 and the output-side rotating plates 22, when the pressure plate 70 rotates with respect to the clutch center 40. Regarding two of the pressure-side cam portions 90 adjacent to each other in the circumferential direction S, the pressure-side assist cam surface 90A of one pressure-side cam portion 90L and the pressure-side slipper cam surface 90S of the other pressure-side cam portion 90M are opposed to each other in the circumferential direction S.

Figure 9A:
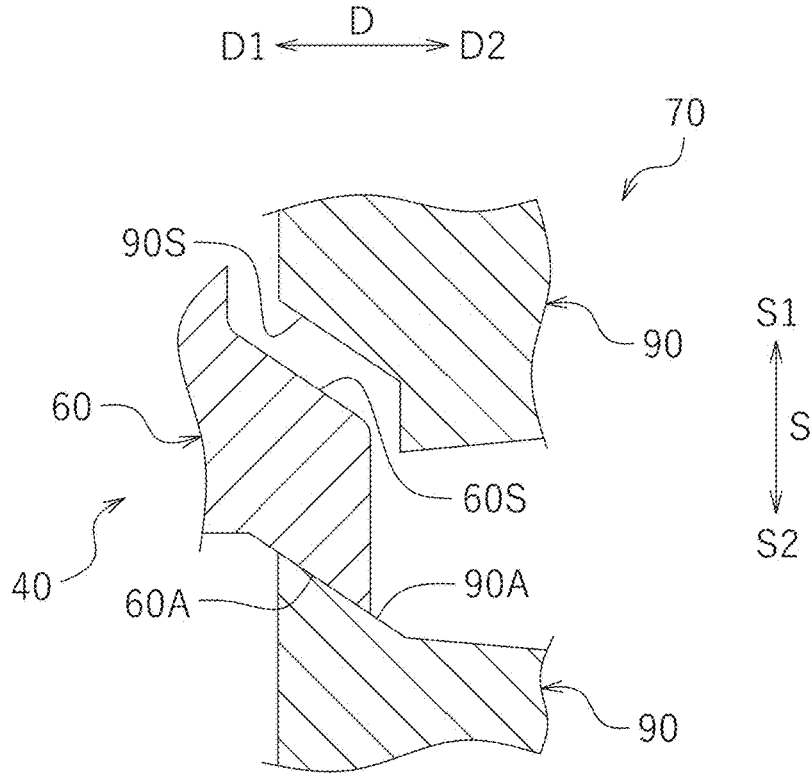
FIG. 9A is a schematic view illustrating effects of a center-side assist cam surface and a pressure-side assist cam surface.

Effects of the center-side cam portions 60 and the pressure-side cam portions 90 will now be described. Referring to FIG. 9A, when the rotation speed of the engine increases so that a rotation driving force input to the input gear 35 and the clutch housing 30 is allowed to be transferred to the output shaft 15 through the clutch center 40, a rotation force in the first circumferential direction S1 is applied to the pressure plate 70. Thus, with the effects of the center-side assist cam surface 60A and the pressure-side assist cam surface 90A, a force in the first direction D1 is generated in the pressure plate 70. Accordingly, a contact pressure force between the input-side rotating plates 20 and the output-side rotating plates 22 increases.

Figure 9B:
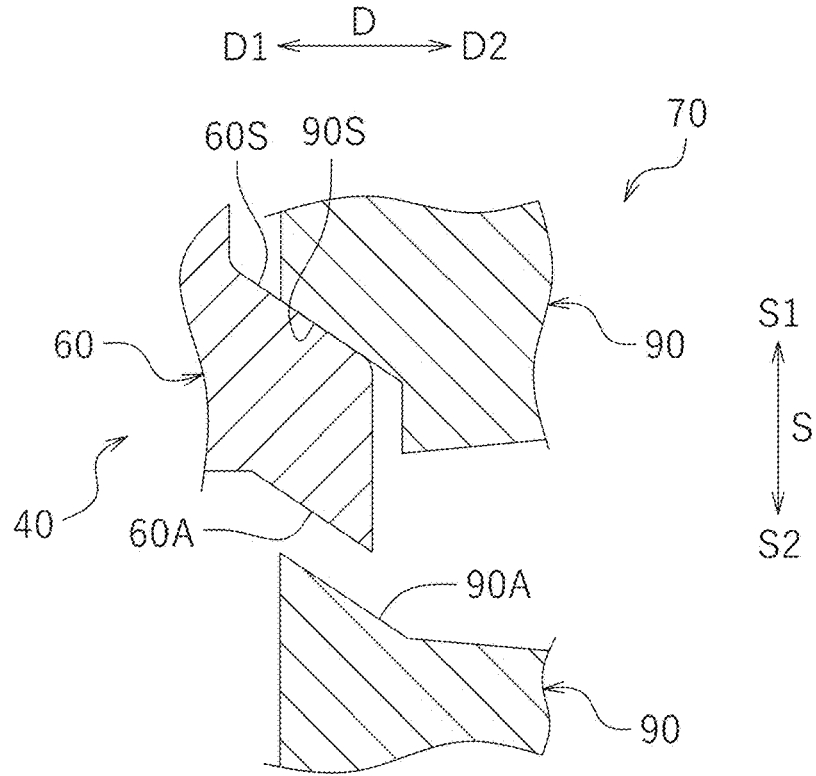
FIG. 9B is a schematic view illustrating effects of a center-side slipper cam surface and a pressure-side slipper cam surface.

By contrast, referring to FIG. 9B, when the rotation speed of the output shaft 15 exceeds the rotation speed of the input gear 35 and the clutch housing 30 and a back torque is generated, a rotation force in the first circumferential direction S1 is applied to the clutch center 40. Thus, with the effects of the center-side slipper cam surface 60S and the pressure-side slipper cam surface 90S, the pressure plate 70 moves in the second direction D2 to cancel the contact pressure force between the input-side rotating plates 20 and the output-side rotating plates 22. In this manner, inconveniences regarding the engine and the transmission caused by the back torque are avoided.

Figure 7:
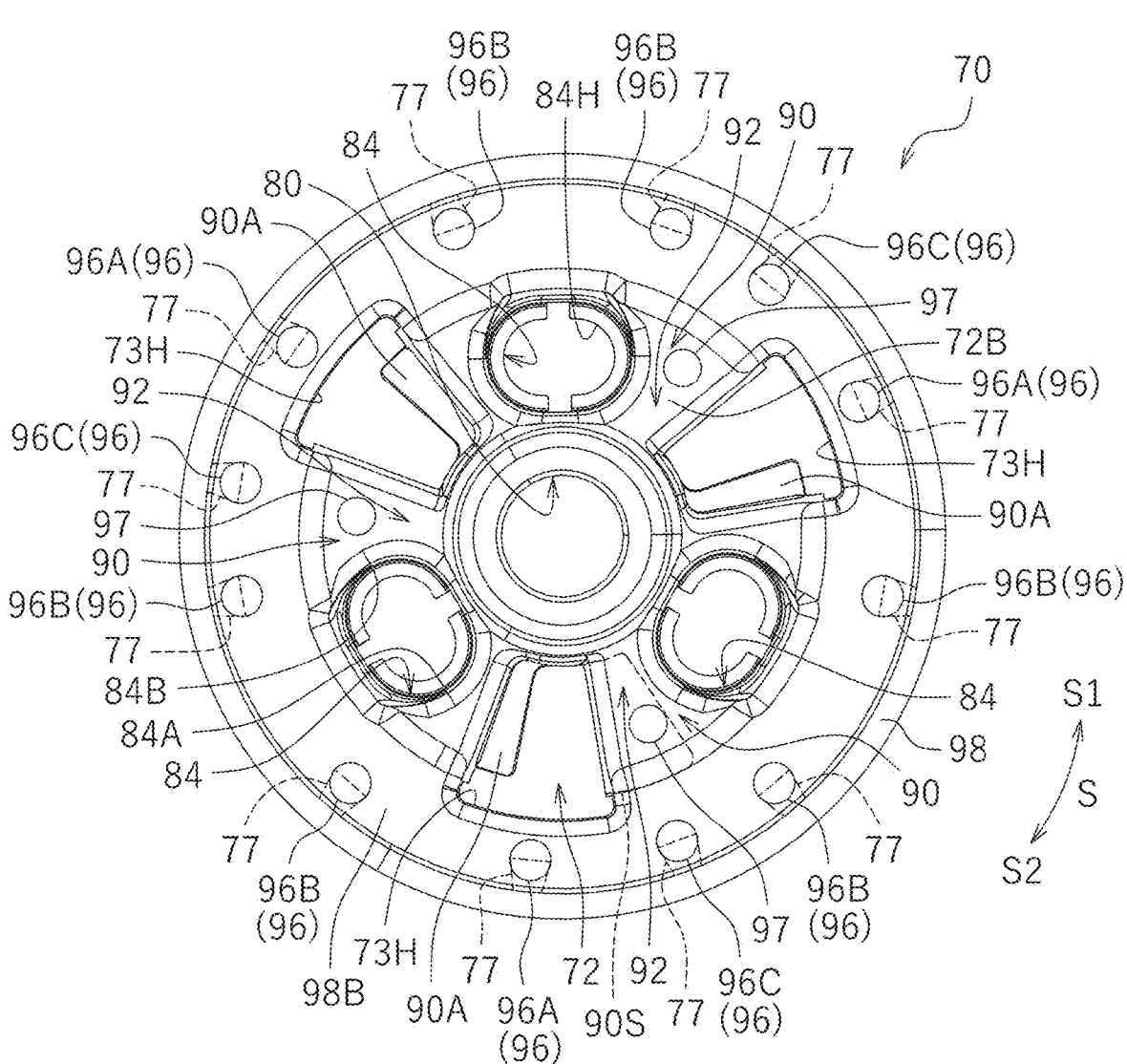
FIG. 7 is a plan view of the pressure plate according to an example embodiment of the present invention.

As illustrated in FIGS. 4 and 5, the pressure plate 70 has pressure-side cam holes 73H penetrating the body 72 and a portion of the flange 98. The pressure-side cam holes 73H are located radially outward of the cylindrical portion 80. Each of the pressure-side cam holes 73H extends from a position to the side of the cylindrical portion 80 to a position radially outward of the pressure-side fitting portion 88. The pressure-side cam hole 73H is positioned between adjacent ones of the pressure-side cam portions 90 while penetrating the body 72. The pressure-side cam hole 73H is positioned between the pressure-side assist cam surface 90A and the pressure-side slipper cam surface 90S of adjacent ones of the pressure-side cam portions 90 while penetrating the body 72. As illustrated in FIGS. 5 and 7, as seen in the axial direction of the pressure plate 70, the pressure-side assist cam surface 90A overlaps a portion of the pressure-side cam hole 73H.

As illustrated in FIGS. 6 and 7, the spring housing portions 84 are provided in the pressure-side cam portions 90. The spring housing portions 84 are recessed from the second direction D2 to the first direction D1. The spring housing portions 84 are opened in a plane on the side of the second direction D2 of the body 72 (in this example embodiment, in a back surface 72B). Each of the spring housing portions 84 has an oval cross-section. The spring housing portion 84 houses a pressure spring 25 (see FIG. 1). The spring housing portion 84 has an insertion hole 84H, into which the boss 54 (see FIG. 2) is inserted. That is, the insertion hole 84H penetrates the pressure-side cam portion 90. The insertion hole 84H has an oval cross-section.

As illustrated in FIG. 1, the pressure springs 25 are housed in the spring housing portions 84. Each of the pressure springs 25 is held by the boss 54 inserted into the insertion hole 84H of the spring housing portion 84. The pressure spring 25 biases the pressure plate 70 toward the clutch center 40 (i.e., in the first direction D1). The pressure spring 25 is, for example, a coil spring formed of helically wound spring steel.

As illustrated in FIG. 4, the pressure-side fitting portion 88 is provided in the main body 72. The pressure-side fitting portion 88 is located radially outward of the pressure-side cam portions 90. The pressure-side fitting portion 88 is located ahead of the pressure-side cam portions 90 in the second direction D2. The pressure-side fitting portion 88 is configured to be slidably insertable into the center-side fitting portion 58 (see FIG. 2).

As illustrated in FIG. 4, the pressure plate 70 includes the plurality of pressure-side fitting teeth 77 formed on the flange 98. The pressure-side fitting teeth 77 hold the output-side rotating plates 22. The pressure-side fitting teeth 77 are located radially outward of the cylindrical portion 80. The pressure-side fitting teeth 77 are located radially outward of the pressure-side cam portions 90. The pressure-side fitting teeth 77 are located radially outward of the pressure-side fitting portion 88. The pressure-side fitting teeth 77 are provided on the front surface 98A of the flange 98. The pressure-side fitting teeth 77 project in the first direction D1 from the flange 98. The plurality of pressure-side fitting teeth 77 are arranged in the circumferential direction S. The plurality of pressure-side fitting teeth 77 are arranged at equal or substantially equal intervals in the circumferential direction S. In this example embodiment, a portion of the pressure-side fitting teeth 77 is removed, and thus the interval between the pressure-side fitting teeth 77 sandwiching such a removed portion of the pressure-side fitting teeth 77 is longer. The other pressure-side fitting teeth 77 are arranged at equal or substantially equal intervals.

Figure 8:
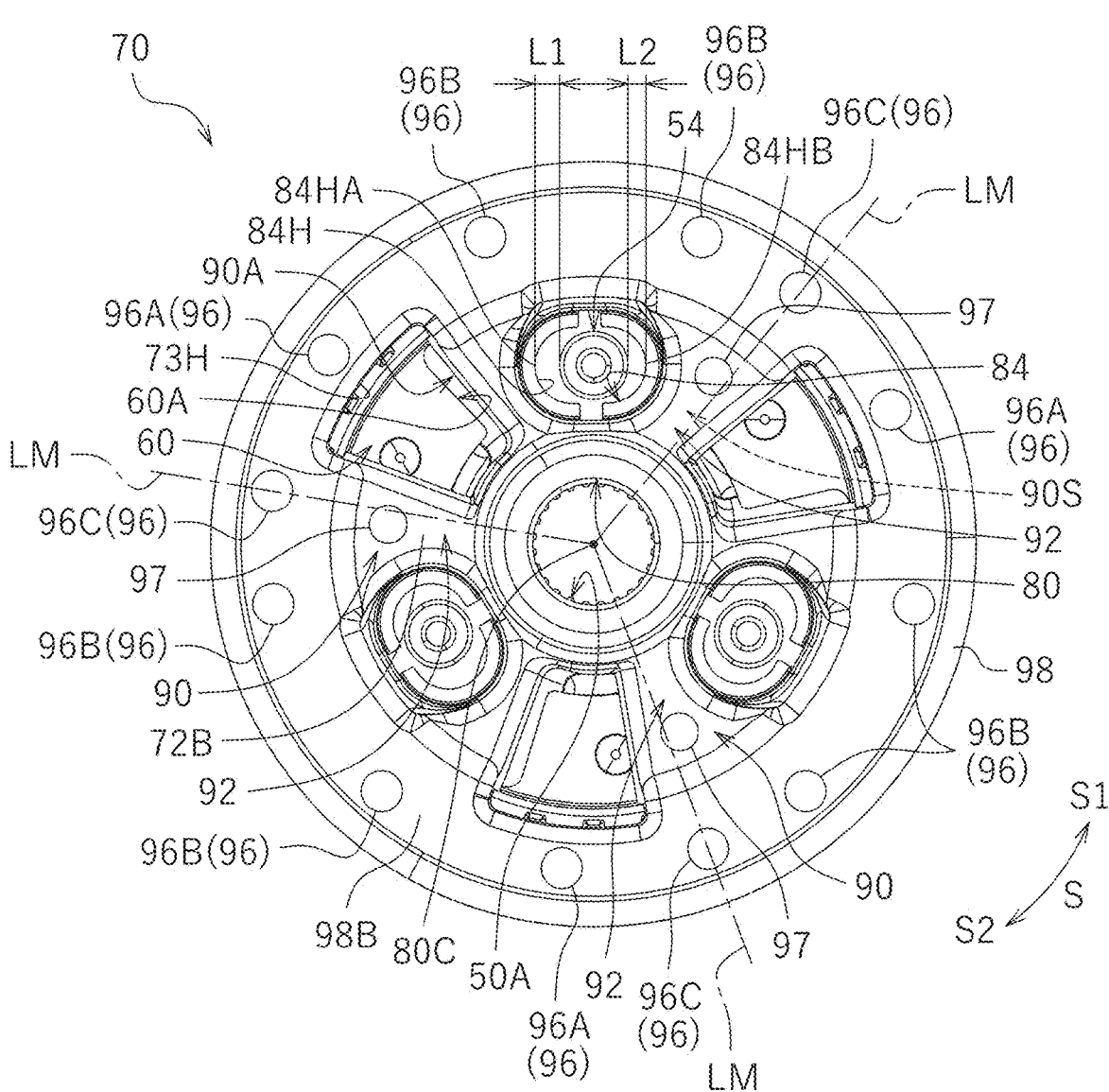
FIG. 8 is a plan view illustrating a state where the clutch center and the pressure plate according to an example embodiment are assembled of the present invention.

As illustrated in FIG. 6, the pressure plate 70 includes a plurality of flange-side recessed portions 96 formed in the back surface 98B of the flange 98. The flange-side recessed portions 96 are recessed in the first direction D1 from the back surface 98B of the flange 98. The flange-side recessed portions 96 are recessed from the back surface 98B by, for example, about 0.1 mm to about 0.5 mm. The flange-side recessed portions 96 may be recessed from the back surface 98B by 0 to about 0.1 mm, for example. Alternatively, the flange-side recessed portions 96 may be recessed from the back surface 98B by a depth deeper than about 0.5 mm, for example. The flange-side recessed portions 96 are, for example, cylindrical or substantially cylindrical. There is no specific limitation on the shape of the flange-side recessed portions 96. As illustrated in FIG. 7, as seen in the axial direction of the output shaft 15, the flange-side recessed portions 96 at least partially overlap the pressure-side fitting teeth 77. The flange-side recessed portions 96 include first flange-side recessed portions 96A, second flange-side recessed portions 96B, and third flange-side recessed portions 96C. The first flange-side recessed portions 96A are located radially outward of the pressure-side cam holes 73H. In this example embodiment, the pressure plate 70 includes three first flange-side recessed portions 96A. The first flange-side recessed portions 96A are located at equal or substantially equal intervals in the circumferential direction S. The second flange-side recessed portions 96B are located radially outward of the spring housing portions 84. In this example embodiment, two second flange-side recessed portions 96B are provided for one spring housing portion 84. One of such two second flange-side recessed portions 96B is provided radially outward of an end 84HA, on one side in the circumferential direction S, of the spring housing portion 84, and the other of such two second flange-side recessed portions 96B is provided radially outward of an end 84HB, on the other side in the circumferential direction S, of the spring housing portion 84. The third flange-side recessed portions 96C are located between the first flange-side recessed portions 96A and the second flange-side recessed portions 96B in the circumferential direction S. The third flange-side recessed portions 96C are located ahead of the pressure-side cam holes 73H in the first circumferential direction S1. The third flange-side recessed portions 96C are located ahead of the spring housing portions 84 in the second circumferential direction S2. As illustrated in FIG. 8, the third flange-side recessed portions 96C are located on extended lines LM extended from rib portions 92 connecting the cylindrical portion 80 and the flange 98 to each other. The extended lines LM pass, for example, a center 80C of the cylindrical portion 80 and body-side recessed portions 97 described below. Herein, the rib portions 92 are portions of the body 72 that are located between the spring housing portions 84 and the pressure-side cam holes 73H in the circumferential direction S, and extend in the radial direction. As seen in a plan view, the rib portions 92 overlap, for example, the pressure-side slipper cam surfaces 90S. The first flange-side recessed portions 96A, the second flange-side recessed portions 96B and the third flange-side recessed portions 96C are located on the same circumference. The flange-side recessed portions 96 are formed by, for example, core pins 140 (see FIG. 13) being pushed against the back surface 98B of the flange 98 as described below. The flange-side recessed portions 96 may be formed by cutting.

As illustrated in FIG. 6, the pressure plate 70 includes the plurality of body-side recessed portions 97 provided in the back surface 72B of the body 72. The body-side recessed portions 97 are recessed in the first direction D1 from the back surface 72B of the body 72. The body-side recessed portions 97 are recessed from the back surface 72B by, for example, about 0.1 mm to about 0.5 mm. The body-side recessed portions 97 may be recessed from the back surface 72B by 0 to about 0.1 mm, for example. Alternatively, the body-side recessed portions 97 may be recessed from the back surface 72B by a depth deeper than about 0.5 mm, for example. As illustrated in FIG. 7, as seen in the axial direction of the output shaft 15, the body-side recessed portions 97 at least partially overlap the pressure-side cam portions 90. As seen in the axial direction of the output shaft 15, the body-side recessed portions 97 at least partially overlap the pressure-side slipper cam surfaces 90S. The body-side recessed portions 97 are provided between the pressure-side cam holes 73H and the spring housing portions 84 in the circumferential direction S. The body-side recessed portions 97 are located ahead of the pressure-side cam holes 73H in the first circumferential direction S1. The body-side recessed portions 97 are respectively located closer to the pressure-side slipper cam surfaces 90S than to the spring housing portions 84. The body-side recessed portions 97 are located ahead of the spring housing portions 84 in the second circumferential direction S2. The plurality of body-side recessed portions 97 are located on the same circumference. The plurality of body-side recessed portions 97 are located at equal or substantially equal intervals in the circumferential direction S. The body-side recessed portions 97 are located radially inward of the flange-side recessed portions 96.

FIG. 8 is a plan view illustrating a state where the clutch center 40 and the pressure plate 70 are assembled. In the state illustrated in FIG. 8, the pressure-side assist cam surfaces 90A and the center-side assist cam surfaces 60A are not in contact with each other, and the pressure-side slipper cam surfaces 90S and the center-side slipper cam surfaces 60S are not in contact with each other. This is a state where the pressure plate 70 is closest to the clutch center 40. In the state illustrated in FIG. 8 (assembly state), a distance L1 in the circumferential direction S between each boss 54 and an end 84HA, on the side of the pressure-side assist cam surface 90A (i.e., on the side of the first circumferential direction S1), of the insertion hole 84H is shorter than a distance L2 in the circumferential direction S between the boss 54 and an end 84HB, on the side of the pressure-side slipper cam surface 90S (i.e., on the side of the second circumferential direction S2), of the insertion hole 84H.

As illustrated in FIG. 1, the stopper plate 100 is contactable with the pressure plate 70. The stopper plate 100 reduces or prevents separation of the pressure plate 70 from the clutch center 40 by a predetermined distance or more in the second direction D2. The stopper plate 100 is secured to the bosses 54 of the clutch center 40 with the bolts 28. The pressure plate 70 is secured by the bolts 28 fastened to the bosses 54 through the stopper plate 100 in a state where the bosses 54 of the clutch center 40 and the pressure springs 25 are located in the spring housing portions 84. The stopper plate 100 is triangular or substantially triangular as seen in a plan view.

When the pressure plate 70 is in contact with the stopper plate 100, the pressure-side slipper cam surface 90S and the center-side slipper cam surface 60S are in contact with each other by about 50% or more and about 90% or less of the area of the pressure-side slipper cam surface 90S and about 50% or more and about 90% or less of the area of the center-side slipper cam surface 60S, for example. When the pressure plate 70 is in contact with the stopper plate 100, the pressure springs 25 are separated from side walls of the spring housing portions 84. That is, the pressure springs 25 are not sandwiched between the bosses 54 and the spring housing portions 84, and application of excessive stress to the bosses 54 is reduced or prevented.

The clutch device 10 is filled with a predetermined amount of clutch oil. The clutch oil is distributed in the clutch center 40 and the pressure plate 70 through the hollow portion 15H of the output shaft 15, and then is supplied to the input-side rotating plates 20 and the output-side rotating plates 22 through the gap between the center-side fitting portion 58 and the pressure-side fitting portion 88 and through the oil flow holes 49. The clutch oil is distributed from the outside of the clutch center 40 to the inside of the clutch center 40 through the hollow portion 15H of the output shaft 15 and through the pressure-side cam holes 73H. The clutch oil reduces or prevents absorption of heat and abrasion of the friction members. The clutch device 10 according to this example embodiment is a so-called multiplate wet friction clutch device.

Figure 10:
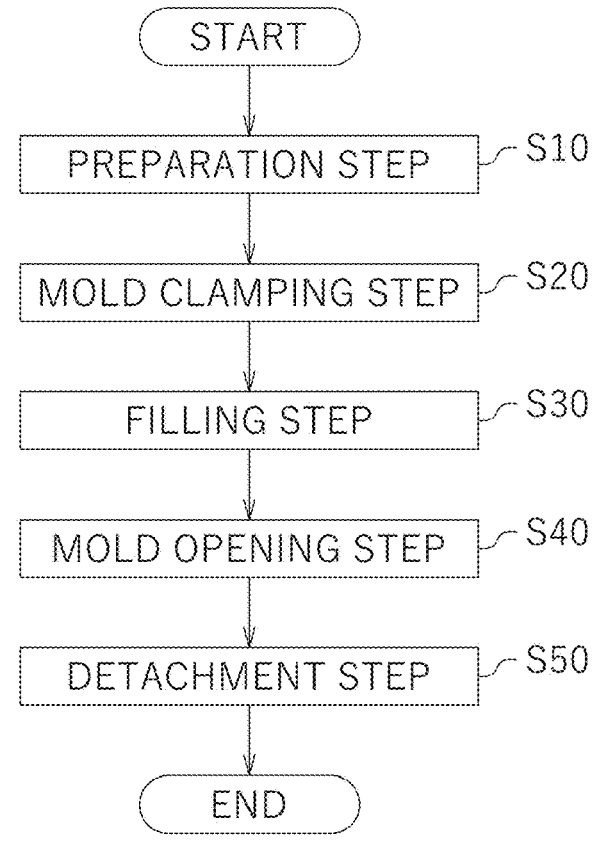
FIG. 10 is a flowchart illustrating a method for producing the pressure plate according to an example embodiment of the present invention.
Figure 11:
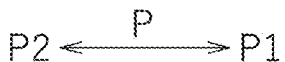
FIG. 11 is a cross-sectional view schematically illustrating a state where a mold is closed.
Figure 11:
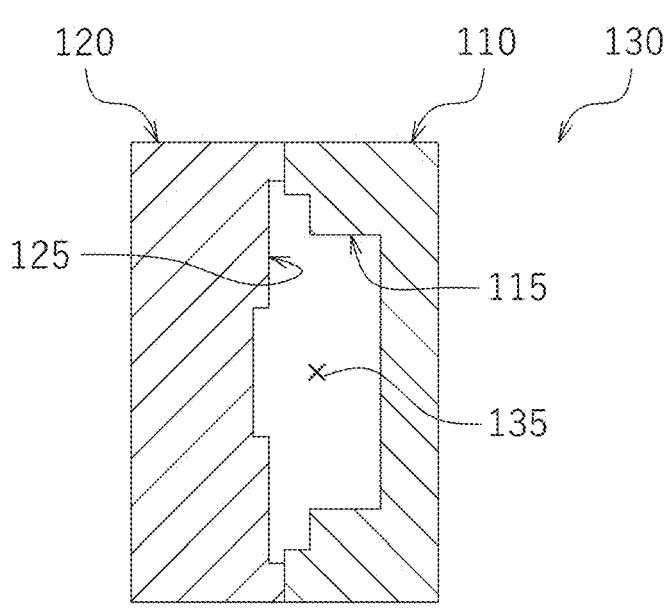
Figure 12:
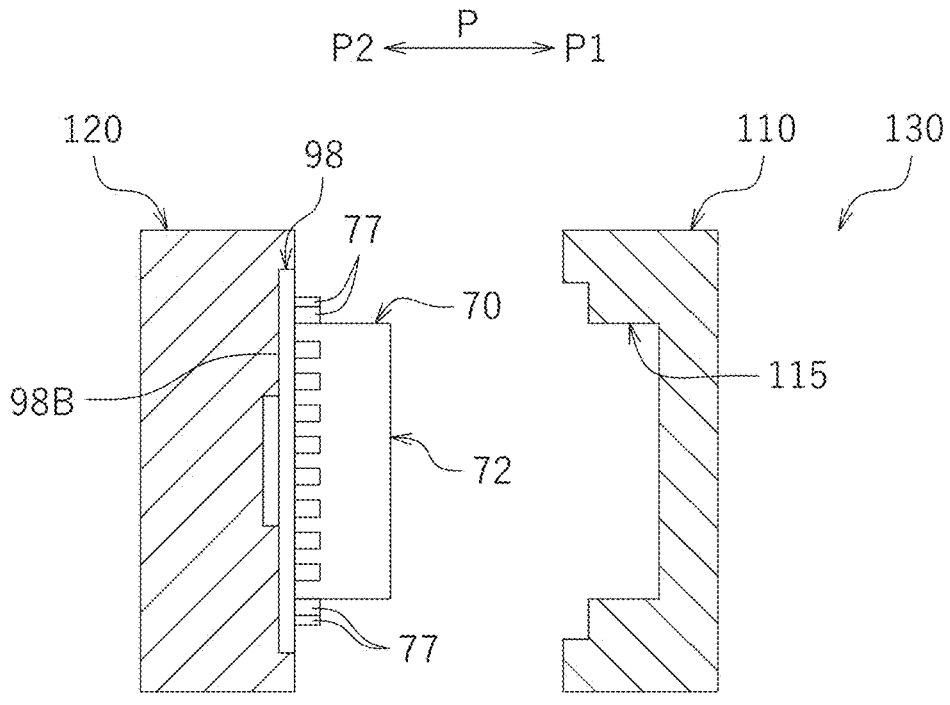
FIG. 12 is a cross-sectional view schematically illustrating a state where the mold is opened as a result of a movable mold being separated from a fixed mold.
Figure 13:
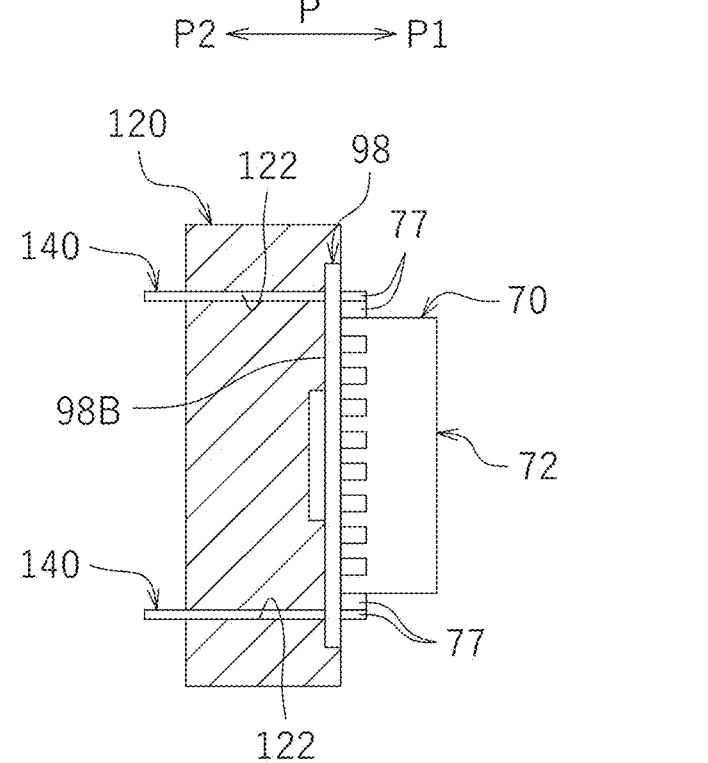
FIG. 13 is a cross-sectional view schematically illustrating a state where a core pin is pushed against a rear surface of the pressure plate secured to the movable mold.

Now, a non-limiting example of a method for producing the pressure plate 70 according to this example embodiment will be described. FIG. 10 is a flowchart illustrating a method for producing the pressure plate 70. As illustrated in FIG. 10, the method for producing the pressure plate 70 includes a preparation step S10, a mold clamping step S20, a filling step S30, a mold opening step S40, and a detachment step S50. In this example embodiment, as illustrated in FIG. 11, the pressure plate 70 is produced by use of a mold 130 including a fixed mold 110 and a movable mold 120. In FIGS. 11 through 13, a direction in which the movable mold 120 moves with respect to the fixed mold 110 will be referred to as a mold moving direction P, a direction in which the movable mold 120 approaches the fixed mold 110 will be referred to as a direction P1, and a direction in which the movable mold 120 is separated away from the fixed mold 110 will be referred to as a direction P2.

First, in the preparation step S10, as illustrated in FIG. 11, the mold 130 including the fixed mold 110 and the movable mold 120 allowed to approach, or to be separated from, the fixed mold 110 is prepared. The fixed mold 110 has a cavity 115 formed therein, which is used to form the body 72, the pressure-side fitting teeth 77 and the like of the pressure plate 70. The movable mold 120 has a core 125 formed therein, which is used to form the flange 98 and the like of the pressure plate 70.

Next, in the mold clamping step S20, as illustrated in FIG. 11, the movable mold 120 is caused to approach the fixed mold 110 to close the mold 130. That is, the movable mold 120 is moved in the direction P1, and thus the fixed mold 110 is closed with the movable mold 120. As a result, a molding space 135, in which the pressure plate 70 is to be formed by molding, is demarcated by the cavity 115 and the core 125.

Next, in the filling step S30, the molding space 135 formed by the movable mold 120 and the fixed mold 110 is filled with a metal material. The metal material may be, for example, an aluminum alloy. The metal material is injected, in a melted state, into the molding space 135 through an injection opening (not shown) provided in the fixed mold 110, and thus fills the molding space 135.

Next, in the mold opening step S40, the metal material is cooled to be solidified to form the pressure plate 70 by molding, and then the movable mold 120 is separated from the fixed mold 110 to open the mold 130. That is, as illustrated in FIG. 12, the movable mold 120 is moved in the direction P2 to be separated away from the fixed mold 110. In this state, the pressure plate 70 formed by molding is fixed to the movable mold 120.

Next, in the detachment step S50, the pressure plate 70 is detached from the movable mold 120. This is performed by pressing the core pins 140 to portions of the back surface 98B of the flange 98 of the pressure plate 70 fixed to the movable mold 120, which overlap the pressure-side fitting teeth 77 as seen in the mold moving direction P (i.e., the axial direction of the output shaft 15). As illustrated in FIG. 13, the movable mold 120 has insertion holes 122 formed therein, into which the core pins 140 are insertable. The core pins 140 are moved in the direction P1 in FIG. 13, and as a result, the pressure plate 70 is detached from the movable mold 120 while the flange-side recessed portions 96 and the body-side recessed portions 97 described above are formed.

In the detachment step S50, for example, the core pins 140 are pushed against portions of the back surface 98B of the flange 98 of the pressure plate 70 fixed to the movable mold 120, that are radially outward of the pressure-side cam holes 73H. As a result, the first flange-side recessed portions 96A are formed in the back surface 98B of the flange 98. In the detachment step S50, for example, the core pins 140 are pushed against portions of the back surface 98B of the flange 98 of the pressure plate 70 fixed to the movable mold 120, that are radially outward of the spring housing portions 84. More specifically, in the detachment step S50, for example, the core pins 140 are pushed against portions of the back surface 98B of the flange 98 of the pressure plate 70 fixed to the movable mold 120, that are radially outward of the ends 84HA, on one side in the circumferential direction S, of the spring housing portions 84 and are radially outward of the ends 84HB, on the other side in the circumferential direction S, of the spring housing portions 84. As a result, the second flange-side recessed portions 96B are formed in the back surface 98B of the flange 98. In the detachment step S50, for example, the core pins 140 are pushed against portions of the back surface 98B of the flange 98 of the pressure plate 70 fixed to the movable mold 120, that are between the pressure-side cam holes 73H and the spring housing portions 84 in the circumferential direction S. As a result, the third flange-side recessed portions 96C are formed in the back surface 98B of the flange 98. In the detachment step S50, for example, the core pins 140 are pushed against portions of the back surface 72B of the body 72 of the pressure plate 70 fixed to the movable mold 120, which overlap the pressure-side cam portions 90 as seen in the mold moving direction P. More specifically, in the detachment step S50, the core pins 140 are pushed against portions of the back surface 72B of the body 72 of the pressure plate 70 fixed to the movable mold 120, which overlap the pressure-side slipper cam surfaces 90S as seen in the mold moving direction P. As a result, the body-side recessed portions 97 are formed in the back surface 72B of the body 72.

An operation of the clutch device 10 according to this example embodiment will now be described. As described above, the clutch device 10 is located between the engine and the transmission of the motorcycle, and allows or blocks transfer of a rotation driving force of the engine to the transmission by an operation by a driver on a clutch operation lever.

In the case where the driver of the motorcycle does not operate the clutch operation lever, the clutch device 10 operates as follows. A clutch release mechanism (not shown) does not press the push rod 16A, and thus, the pressure plate 70 presses the input-side rotating plates 20 with a biasing force (elastic force) of the pressure springs 25. Accordingly, the clutch center 40 enters a clutch-ON state, in which the input-side rotating plates 20 and the output-side rotating plates 22 are pushed against each other to be friction-coupled, and the clutch center 40 is rotationally driven. That is, a rotation driving force of the engine is transferred to the clutch center 40, and the output shaft 15 is rotationally driven.

In the clutch-ON state, clutch oil flowing in the hollow portion 15H of the output shaft 15 and then flowing out of the distal end 15T of the output shaft 15 is dropped or spattered into the cylindrical portion 80 and attached to the cylindrical portion 80 (see arrow F in FIG. 1). The clutch oil attached to the inside of the cylindrical portion 80 is guided into the clutch center 40. Accordingly, the clutch oil flows to the outside of the clutch center 40 through the oil flow holes 49. The clutch oil also flows to the outside of the clutch center 40 through the gap between the center-side fitting portion 58 and the pressure-side fitting portion 88. Then, the clutch oil flowing to the outside of the clutch center 40 is supplied to the input-side rotating plates 20 and the output-side rotating plates 22.

By contrast, when the driver of the motorcycle operates the clutch operation lever in the clutch-ON state, the clutch device 10 operates as follows. The clutch release mechanism (not shown) presses the push rod 16A, and thus, the pressure plate 70 is displaced in a direction away from the clutch center 40 (in the second direction D2) against a biasing force of the pressure springs 25. Accordingly, the clutch center 40 enters a clutch-OFF state, in which the friction coupling between the input-side rotating plates 20 and the output-side rotating plates 22 is canceled, and thus, rotational driving attenuates or stops. That is, the rotation driving force of the engine is blocked and is not transferred to the clutch center 40.

In the clutch-OFF state, clutch oil flowing in the hollow portion 15H of the output shaft 15 and then flowing out of the distal end 15T of the output shaft 15 is guided into the clutch center 40 in the same manner as in the clutch-ON state. At this point, the pressure plate 70 is separated from the clutch center 40, and thus, the amount of fitting between the center-side fitting portion 58 and the pressure-side fitting portion 88 decreases. As a result, the clutch oil in the cylindrical portion 80 more actively flows to the outside of the clutch center 40, and is distributed to various portions in the clutch device 10. In particular, the clutch oil can be actively guided to gaps between the input-side rotating plates 20 and the output-side rotating plates 22 separated from each other.

Then, when the driver releases the clutch operation lever in the clutch-OFF state, the pressure plate 70 is released from the state of being pressed by the clutch release mechanism (not shown) through the push body 16B, and thus, the pressure plate 70 is displaced in a direction toward the clutch center 40 (in the first direction D1) by a biasing force of the pressure springs 25.

As described above, in the clutch device 10 according to this example embodiment, the pressure plate 70 includes the flange-side recessed portions 96 recessed in the first direction D1 from a second direction D2-side surface of the flange 98 (in this example embodiment, the back surface 98B). As can be seen, the pressure plate 70 includes the flange-side recessed portions 96 formed therein. This makes the pressure plate 70 lightweight. In addition, as seen in the axial direction of the output shaft 15, the flange-side recessed portions 96 at least partially overlap the pressure-side fitting teeth 77. As described above, the pressure-side fitting teeth 77 are formed on a first direction D1-side surface (in this example embodiment, the front surface 98A) of the flange 98. Portions, of the second direction D2-side surface of the flange 98, that correspond to such portions of the front surface 98A are relatively rigid. Therefore, the flange-side recessed portions 96 are formed in the portions of the back surface 98B, which overlap the pressure-side fitting teeth 77, so that the pressure plate 70 is made rigid with certainty and also lightweight.

In the clutch device 10 according to this example embodiment, the flange-side recessed portions 96 include the first flange-side recessed portions 96A, which are located radially outward of the pressure-side cam holes 73H. According to the above-described example embodiment, a stress applied to the portions radially outward of the pressure-side cam holes 73H is relatively small. Therefore, the first flange-side recessed portions 96A are provided in such portions, so that the pressure plate 70 is allowed to provide a certain level of performance and also to be lightweight.

In the clutch device 10 according to this example embodiment, the flange-side recessed portions 96 include the second flange-side recessed portions 96B, which are located radially outward of the spring housing portions 84. According to the above-described example embodiment, a stress applied to the portions radially outward of the spring housing portions 84 is relatively small. Therefore, the second flange-side recessed portions 96B are provided in such portions, so that the pressure plate 70 is allowed to provide a certain level of performance and also to be lightweight.

In the clutch device 10 according to this example embodiment, the second flange-side recessed portions 96B are located radially outward of the ends 84HA, on one side in the circumferential direction S, of the spring housing portions 84, and radially outward of the ends 84HB, on the other side in the circumferential direction S, of the spring housing portions 84. According to the above-described example embodiment, the pressure plate 70 is made more lightweight.

In the clutch device 10 according to this example embodiment, the pressure plate 70 includes the plurality of pressure-side cam portions 90 provided in the body 72 and the body-side recessed portions 97 recessed in the first direction D1 from the second direction D2-side surface (in this example embodiment, the back surface 98B) of the body 72. The plurality of pressure-side cam portions 90 each include at least one of the pressure-side assist cam surface 90A and the pressure-side slipper cam surface 90S. The pressure-side assist cam surface 90A generates a force from the pressure plate 70 toward the clutch center 40, in order to increase a pressing force between the input-side rotating plates 20 and the output-side rotating plates 22, when the pressure plate 70 rotates with respect to the clutch center 40. The pressure-side slipper cam surface 90S separates the pressure plate 70 from the clutch center 40, in order to decrease the pressing force between the input-side rotating plates 20 and the output-side rotating plates 22, when the pressure plate 70 rotates with respect to the clutch center 40. As seen in the axial direction of the output shaft 15, the body-side recessed portions 97 at least partially overlap the pressure-side cam portions 90. As can be seen, the pressure plate 70 includes the body-side recessed portions 97, and therefore, is lightweight. In addition, as seen in the axial direction of the output shaft 15, the body-side recessed portions 97 at least partially overlap the pressure-side cam portions 90. The portions, of the body 72, where the pressure-side cam portions 90 are formed are relatively rigid. Therefore, the body-side recessed portions 97 are formed in the portions, of the body 72, which overlap the pressure-side cam portions 90, so that the pressure plate 70 is made rigid with certainty and also lightweight.

In the clutch device 10 according to this example embodiment, the pressure-side cam portions 90 each include the pressure-side slipper cam surface 90S. As seen in the axial direction of the output shaft 15, the body-side recessed portions 97 at least partially overlap the pressure-side slipper cam surfaces 90S. According to the above-described example embodiment, portions, of the pressure-side cam portions 90, where the pressure-side slipper cam surfaces 90S are relatively rigid. Therefore, the body-side recessed portions 97 are provided in the portions, of the body 72, which overlap the pressure-side slipper cam surfaces 90S, so that the pressure plate 70 is made rigid with certainty and also lightweight.

In the clutch device 10 according to this example embodiment, the pressure plate 70 includes the cylindrical portion 80 provided in the body 72 and housing the output shaft 15. The flange-side recessed portions 96 are located on the extended lines LM extended from the ribs 92 connecting the cylindrical portion 80 and the flange 98 to each other. According to the above-described example embodiment, the portions of the flange 98, that are on the extended lines LM extended from the ribs 92 connecting the cylindrical portion 80 and the flange 98 to each other are relatively rigid. Therefore, the flange-side recessed portions 96 are provided on the extended lines extended from the ribs 92 connecting the cylindrical portion 80 and the flange 98 to each other (i.e., on the straight lines LM), so that the pressure plate 70 is made rigid with certainty and also lightweight.

With the method for producing the pressure plate 70 according to this example embodiment, in the detachment step S50, the core pins 140 are pushed against the portions of the back surface 98B of the flange 98 of the pressure plate 70 fixed to the movable mold 120, which overlap the pressure-side fitting teeth 77 as seen in the mold moving direction P. As described above, the pressure-side fitting teeth 77 are formed on the front surface 98A of the flange 98. Portions of the back surface 98B of the flange 98, which correspond to such portions of the front surface 98A are relatively rigid. Therefore, the core pins 140 are pushed against the portions of the back surface 98B, which overlap the pressure-side fitting teeth 77 as seen in the mold moving direction P, so that the pressure plate 70 is prevented from being deformed while the flange-side recessed portions 96 are provided in the back surface 98B, and thus the pressure-plate 70 is detached from the movable mold 120.

With the production method according to this example embodiment, in the detachment step S50, the core pins 140 are pushed against the portions of the back surface 98B of the flange 98 of the pressure plate 70 fixed to the movable mold 120, that are located radially outward of the pressure-side cam holes 73H. According to the above-described example embodiment, the core pins 140 are pushed against the portions of the back surface 98B of the flange 98, that are located radially outward of the pressure-side cam holes 73H, so that the portions, of the pressure plate 70, that are in the vicinity of the pressure-side cam holes 73H are prevented from being deformed while the flange-side recessed portions 96 are provided in such portions, and thus the pressure-plate 70 is detached from the movable mold 120.

With the production method according to this example embodiment, in the detachment step S50, the core pins 140 are pushed against the portions of the back surface 98B of the flange 98 of the pressure plate 70 fixed to the movable mold 120, that are located radially outward of the spring housing portions 84. According to the above-described example embodiment, the core pins 140 are pushed against the portions of the back surface 98B of the flange 98, that are located radially outward of the spring housing portions 84, so that the portions, of the pressure plate 70, that are in the vicinity of the spring housing portions 84 are prevented from being deformed while the flange-side recessed portions 96 are provided in such portions, and thus the pressure-plate 70 is detached from the movable mold 120.

With the production method according to this example embodiment, in the detachment step S50, the core pins 140 are pushed against the portions of the back surface 98B of the flange 98 of the pressure plate 70 fixed to the movable mold 120, that are located radially outward of the ends 84HA, on one side in the circumferential direction S, of the spring housing portions 84 and are radially outward of the ends 84HB, on the other side in the circumferential direction S, of the spring housing portions 84. According to the above-described example embodiment, the portions, of the pressure plate 70 that are in the vicinity of the spring housing portions 84 are further prevented from being deformed.

With the production method according to this example embodiment, in the detachment step S50, the core pins 140 are pushed against the portions of the back surface 72B of the body 72 of the pressure plate 70 fixed to the movable mold 120, which overlap the pressure-side cam portions 90 as seen in the mold moving direction P. The portions of the back surface 72B of the body 72, which overlap the pressure-side cam portions 90 as seen in the mold moving direction P are relatively rigid. Therefore, the core pins 140 are pushed against the portions of the back surface 72B, which overlap the pressure-side cam portions 90 as seen in the mold moving direction P, so that the pressure plate 70 is prevented from being deformed while the body-side recessed portions 97 are provided in the back surface 72B of the body 72, and thus the pressure-plate 70 is detached from the movable mold 120.

With the production method according to this example embodiment, in the detachment step S50, the core pins 140 are pushed against the portions of the back surface 72B of the body 72 of the pressure plate 70 fixed to the movable mold 120, which overlap the pressure-side slipper cam surfaces 90S as seen in the mold moving direction P. According to the above-described example embodiment, the portions of the back surface 72B of the body 72, where the pressure-side slipper cam surfaces 90S are provided, are relatively rigid. Therefore, the core pins 140 are pushed against the portions of the back surface 72B, which overlap the pressure-side slipper cam surfaces 90S as seen in the mold moving direction P so that that the pressure plate 70 is prevented from being deformed while the body-side recessed portions 97 are provided in the back surface 72B of the body 72, and thus the pressure-plate 70 is detached from the movable mold 120.

With the production method according to this example embodiment, the pressure plate 70 includes the cylindrical portion 80 provided in the body 72 and housing the output shaft 15. The portions of the back surface 98B of the flange 98, which overlap the pressure-side fitting teeth 77 as seen in the mold moving direction P are located on the extended lines LM extended from the ribs 92 connecting the cylindrical portion 80 and the flange 98 to each other. According to the above-described example embodiment, the portions of the flange 98 that are on the extended lines extended from the ribs 92 connecting the cylindrical portion 80 and the flange 98 to each other are relatively rigid. Therefore, the core pins 140 are pushed against the portions of the flange 98, that are on the extended lines extended from the ribs 92 connecting the cylindrical portion 80 and the flange 98 to each other (i.e., on the straight lines LM), so that the pressure plate 70 is prevented from being deformed while the flange-side recessed portions 96 are provided in the back surface 98B of the flange 98, and thus the pressure-plate 70 is detached from the movable mold 120.

Some example embodiments of the present invention have been described. The above-described example embodiments are merely examples, and the present invention may be carried out in any of various other forms.

In the above-described example embodiments, the center-side cam portions 60 each include the center-side assist cam surface 60A and the center-side slipper cam surface 60S. It is sufficient that the center-side cam portions 60 each include at least one of the center-side assist cam surface 60A and the center-side slipper cam surface 60S.

In the above-described example embodiments, the pressure-side cam portions 90 each include the pressure-side assist cam surface 90A and the pressure-side slipper cam surface 90S. It is sufficient that the pressure-side cam portions 90 each include at least one of the pressure-side assist cam surface 90A and the pressure-side slipper cam surface 90S.

In the above-described example embodiments, the body-side recessed portions 97 are located at such positions as to at least partially overlap the pressure-side slipper cam surfaces 90S as seen in the axial direction of the output shaft 15. The body-side recessed portions 97 are not limited to this. For example, the body-side recessed portions 97 may be located at such positions as to at least partially overlap the pressure-side assist cam surfaces 90A as seen in the axial direction of the output shaft 15.

In the above-described example embodiments, the flange-side recessed portions 96 include the first flange-side recessed portions 96A and the third flange-side recessed portions 96C. The flange-side recessed portions 96 may include one of the first flange-side recessed portions 96A and the third flange-side recessed portions 96C. For example, the flange-side recessed portions 96 may include the first flange-side recessed portions 96A and the second flange-side recessed portions 96B, or may include the second flange-side recessed portions 96B and the third flange-side recessed portions 96C.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A clutch device allowing or blocking transfer of a rotation driving force of an input shaft to an output shaft, the clutch device comprising:

a clutch center housed in a clutch housing holding a plurality of input-side rotating plates rotationally drivable by rotational driving of the input shaft, the clutch center holding a portion of a plurality of output-side rotating plates alternately arranged with the input-side rotating plates, the clutch center being rotationally drivable together with the output shaft; and a pressure plate movable toward or away from the clutch center and rotatable with respect to the clutch center, the pressure plate being capable of pressing the input-side rotating plates and the output-side rotating plates; wherein the pressure plate includes:

a body;

a flange extending radially outward from an outer circumferential edge of the body;

a plurality of pressure-side fitting teeth projecting in a first direction from a first direction-side surface of the flange, holding another portion of the plurality of output-side rotating plates, and being arranged in a circumferential direction, where the first direction is a direction in which the pressure plate moves toward the clutch center, and a second direction is a direction in which the pressure plate moves away from the clutch center;

a plurality of pressure-side cam portions provided in the body and each including a pressure-side assist cam surface and a pressure-side slipper cam surface, the pressure-side assist cam surface being operable to generate a force in a direction from the pressure plate toward the clutch center, in order to increase a pressing force between the input-side rotating plates and the output-side rotating plates, when the pressure plate rotates with respect to the clutch center, and the pressure-side slipper cam surface separating the pressure plate from the clutch center in order to decrease the pressing force between the input-side rotating plates and the output-side rotating plates when the pressure plate rotates with respect to the clutch center; and a body-side recessed portion recessed in the first direction from a second direction-side surface of the body; and as seen in an axial direction of the output shaft, the body-side recessed portion at least partially overlaps one of the pressure-side slipper cam surfaces.

2. A clutch device allowing or blocking transfer of a rotation driving force of an input shaft to an output shaft, the clutch device comprising:

a clutch center housed in a clutch housing holding a plurality of input-side rotating plates rotationally drivable by rotational driving of the input shaft, the clutch center holding a portion of a plurality of output-side rotating plates alternately arranged with the input-side rotating plates, the clutch center being rotationally drivable together with the output shaft; and a pressure plate movable toward or away from the clutch center and rotatable with respect to the clutch center, the pressure plate being capable of pressing the input-side rotating plates and the output-side rotating plates; wherein the pressure plate includes:

a body;

a flange extending radially outward from an outer circumferential edge of the body;

a plurality of pressure-side fitting teeth projecting in a first direction from a first direction-side surface of the flange, holding another portion of the plurality of output-side rotating plates, and being arranged in a circumferential direction, where the first direction is a direction in which the pressure plate moves toward the clutch center, and a second direction is a direction in which the pressure plate moves away from the clutch center;

a plurality of pressure-side cam portions provided in the body and each including at least one of a pressure-side assist cam surface and a pressure-side slipper cam surface, the pressure-side assist cam surface being operable to generate a force in a direction from the pressure plate toward the clutch center in order to increase a pressing force between the input-side rotating plates and the output-side rotating plates when the pressure plate rotates with respect to the clutch center, and the pressure-side slipper cam surface separating the pressure plate from the clutch center in order to decrease the pressing force between the input-side rotating plates and the output-side rotating plates when the pressure plate rotates with respect to the clutch center; and a body-side recessed portion recessed in the first direction from a second direction-side surface of the body;

as seen in an axial direction of the output shaft, the body-side recessed portion at least partially overlaps one of the pressure-side cam portions; and the body-side recessed portion has a same shape as that of a portion of a core pin usable to detach the pressure plate from a mold by pushing of the portion.

3. A clutch device allowing or blocking transfer of a rotation driving force of an input shaft to an output shaft, the clutch device comprising:

a clutch center housed in a clutch housing holding a plurality of input-side rotating plates rotationally drivable by rotational driving of the input shaft, the clutch center holding a portion of a plurality of output-side rotating plates alternately arranged with the input-side rotating plates, the clutch center being rotationally drivable together with the output shaft; and a pressure plate movable toward or away from the clutch center and rotatable with respect to the clutch center, the pressure plate being capable of pressing the input-side rotating plates and the output-side rotating plates; wherein the pressure plate includes:

a body;

a flange extending radially outward from an outer circumferential edge of the body;

a plurality of pressure-side fitting teeth projecting in a first direction from a first direction-side surface of the flange, holding another portion of the plurality of output-side rotating plates, and being arranged in a circumferential direction, where the first direction is a direction in which the pressure plate moves toward the clutch center, and a second direction is a direction in which the pressure plate moves away from the clutch center;

a cylindrical portion provided in the body and housing the output shaft;

a body-side recessed portion recessed in the first direction from a second direction-side surface of the body; and a rib connecting the cylindrical portion and the flange to each other;

the body-side recessed portion is located in the rib; and the body-side recessed portion has a same shape as that of a portion of a core pin usable to detach the pressure plate from a mold by pushing of the portion.

4. A clutch device allowing or blocking transfer of a rotation driving force of an input shaft to an output shaft, the clutch device comprising:

a clutch center housed in a clutch housing holding a plurality of input-side rotating plates rotationally drivable by rotational driving of the input shaft, the clutch center holding a portion of a plurality of output-side rotating plates alternately arranged with the input-side rotating plates, the clutch center being rotationally drivable together with the output shaft; and a pressure plate movable toward or away from the clutch center and rotatable with respect to the clutch center, the pressure plate being capable of pressing the input-side rotating plates and the output-side rotating plates; wherein the pressure plate includes:

a body;

a flange extending radially outward from an outer circumferential edge of the body;

a plurality of pressure-side fitting teeth projecting in a first direction from a first direction-side surface of the flange, holding another portion of the plurality of output-side rotating plates, and being arranged in a circumferential direction, where the first direction is a direction in which the pressure plate moves toward the clutch center, and a second direction is a direction in which the pressure plate moves away from the clutch center;

a plurality of pressure-side cam portions provided in the body and each including at least one of a pressure-side assist cam surface and a pressure-side slipper cam surface, the pressure-side assist cam surface being operable to generate a force in a direction from the pressure plate toward the clutch center, in order to increase a pressing force between the input-side rotating plates and the output-side rotating plates when the pressure plate rotates with respect to the clutch center, and the pressure-side slipper cam surface separating the pressure plate from the clutch center in order to decrease the pressing force between the input-side rotating plates and the output-side rotating plates when the pressure plate rotates with respect to the clutch center; and a body-side recessed portion recessed in the first direction from a second direction-side surface of the body; and the body-side recessed portion has a same shape as that of a portion of a core pin usable to detach the pressure plate from a mold by pushing of the portion.

5. A clutch device allowing or blocking transfer of a rotation driving force of an input shaft to an output shaft, the clutch device comprising:

a clutch center housed in a clutch housing holding a plurality of input-side rotating plates rotationally drivable by rotational driving of the input shaft, the clutch center holding a portion of a plurality of output-side rotating plates alternately arranged with the input-side rotating plates, the clutch center being rotationally drivable together with the output shaft; and a pressure plate movable toward or away from the clutch center and rotatable with respect to the clutch center, the pressure plate being capable of pressing the input-side rotating plates and the output-side rotating plates; wherein the pressure plate includes:

a body;

a flange extending radially outward from an outer circumferential edge of the body;

a plurality of pressure-side fitting teeth projecting in a first direction from a first direction-side surface of the flange, holding another portion of the plurality of output-side rotating plates, and being arranged in a circumferential direction, where the first direction is a direction in which the pressure plate moves toward the clutch center, and a second direction is a direction in which the pressure plate moves away from the clutch center;

a plurality of pressure-side cam portions provided in the body and each including a pressure-side assist cam surface and a pressure-side slipper cam surface, the pressure-side assist cam surface being operable to generate a force in a direction from the pressure plate toward the clutch center in order to increase a pressing force between the input-side rotating plates and the output-side rotating plates when the pressure plate rotates with respect to the clutch center, and the pressure-side slipper cam surface separating the pressure plate from the clutch center in order to decrease the pressing force between the input-side rotating plates and the output-side rotating plates when the pressure plate rotates with respect to the clutch center;

a spring housing portion provided in one of the pressure-side cam portions and opened in a second direction-side surface of the body, the spring housing portion housing a pressure spring biasing the pressure plate in the first direction;

a body-side recessed portion recessed in the first direction from the second direction-side surface of the body; and a flange-side recessed portion recessed in the first direction from a second direction-side surface of the flange;

the pressure-side assist cam surface is located at an end on one side, in the circumferential direction, of the pressure-side cam portion;

the pressure-side slipper cam surface is located at an end on the other side, in the circumferential direction, of the pressure-side cam portion; and as seen in an axial direction of the output shaft, the body-side recessed portion is located closer to one of the pressure-side slipper cam surfaces corresponding thereto than to the spring housing portion.

6. A clutch device allowing or blocking transfer of a rotation driving force of an input shaft to an output shaft, the clutch device comprising:

a clutch center housed in a clutch housing holding a plurality of input-side rotating plates rotationally drivable by rotational driving of the input shaft, the clutch center holding a portion of a plurality of output-side rotating plates alternately arranged with the input-side rotating plates, the clutch center being rotationally drivable together with the output shaft; and a pressure plate movable toward or away from the clutch center and rotatable with respect to the clutch center, the pressure plate being capable of pressing the input-side rotating plates and the output-side rotating plates; wherein the pressure plate includes:

a body;

a flange extending radially outward from an outer circumferential edge of the body;

a plurality of pressure-side fitting teeth projecting in a first direction from a first direction-side surface of the flange, holding another portion of the plurality of output-side rotating plates, and being arranged in a circumferential direction, where the first direction is a direction in which the pressure plate moves toward the clutch center, and a second direction is a direction in which the pressure plate moves away from the clutch center;

a plurality of pressure-side cam portions provided in the body and each including at least one of a pressure-side assist cam surface and a pressure-side slipper cam surface, the pressure-side assist cam surface being operable to generate a force in such a direction to cause the pressure plate to approach the clutch center in order to increase a pressing force between the input-side rotating plates and the output-side rotating plates when the pressure plate rotates with respect to the clutch center, and the pressure-side slipper cam surface separating the pressure plate from the clutch center in order to decrease the pressing force between the input-side rotating plates and the output-side rotating plates when the pressure plate rotates with respect to the clutch center;

a body-side recessed portion recessed in the first direction from a second direction-side surface of the body; and a flange-side recessed portion recessed in the first direction from a second direction-side surface of the flange; and the flange-side recessed portion has a same shape as that of a portion of a core pin usable to detach the pressure plate from a mold by pushing of the portion.

7. A clutch device allowing or blocking transfer of a rotation driving force of an input shaft to an output shaft, the clutch device comprising:

a clutch center housed in a clutch housing holding a plurality of input-side rotating plates rotationally drivable by rotational driving of the input shaft, the clutch center holding a portion of a plurality of output-side rotating plates alternately arranged with the input-side rotating plates, the clutch center being rotationally drivable together with the output shaft; and a pressure plate movable toward or away from the clutch center and rotatable with respect to the clutch center, the pressure plate being capable of pressing the input-side rotating plates and the output-side rotating plates; wherein the pressure plate includes:

a body;

a flange extending radially outward from an outer circumferential edge of the body;

a plurality of pressure-side fitting teeth projecting in a first direction from a first direction-side surface of the flange, holding another portion of the plurality of output-side rotating plates, and being arranged in a circumferential direction, where the first direction is a direction in which the pressure plate moves toward the clutch center, and a second direction is a direction in which the pressure plate moves away from the clutch center;

a plurality of pressure-side cam portions provided in the body and each including at least one of a pressure-side assist cam surface and a pressure-side slipper cam surface, the pressure-side assist cam surface being operable to generate a force in a direction from the pressure plate toward the clutch center in order to increase a pressing force between the input-side rotating plates and the output-side rotating plates when the pressure plate rotates with respect to the clutch center, and the pressure-side slipper cam surface separating the pressure plate from the clutch center in order to decrease the pressing force between the input-side rotating plates and the output-side rotating plates when the pressure plate rotates with respect to the clutch center;

a body-side recessed portion recessed in the first direction from a second direction-side surface of the body; and a flange-side recessed portion recessed in the first direction from a second direction-side surface of the flange and not in communication with the first direction-side surface of the flange;

the pressure plate further includes a spring housing portion provided in one of the pressure-side cam portions and housing a pressure spring biasing the pressure plate in the first direction; and the flange-side recessed portion is located radially outward of the spring housing portion.

8. A motorcycle, comprising the clutch device according to claim 1.

9. A method for producing a pressure plate including a body, a flange extending radially outward from an outer circumferential edge of the body, a plurality of pressure-side fitting teeth projecting from a front surface of the flange, holding output-side rotating plates, and being arranged in a circumferential direction, a plurality of pressure-side cam portions provided in the body and each including at least one of a pressure-side assist cam surface and a pressure-side slipper cam surface, the pressure-side assist cam surface being operable to generate a force in a direction from the pressure plate toward a clutch center in order to increase a pressing force between input-side rotating plates and the output-side rotating plates when the pressure plate rotates with respect to the clutch center, and the pressure-side slipper cam surface separating the pressure plate from the clutch center in order to decrease the pressing force between the input-side rotating plates and the output-side rotating plates when the pressure plate rotates with respect to the clutch center, and a body-side recessed portion in a back surface of the body, the method comprising:

preparing a mold including a fixed mold and a movable mold capable of approaching or separating from the fixed mold;

causing the movable mold to approach the fixed mold to close the mold;

filling a molding space formed by the movable mold and the fixed mold with a metal material;

cooling and solidifying the metal material to form the pressure plate by molding and then separating the movable mold from the fixed mold to open the mold; and detaching the pressure plate from the movable mold by pushing a core pin against a portion of the back surface of the body of the pressure plate fixed to the movable mold, which overlaps one of the pressure-side cam portions as seen in a mold moving direction to detach the pressure plate from the movable mold, the mold moving direction being a direction in which the movable mold is moved with respect to the fixed mold.

10. The method according to claim 9, wherein each of the pressure-side cam portions includes the pressure-side slipper cam surface; and the detaching includes pushing the core pin against a portion of the back surface of the body of the pressure plate fixed to the movable mold, which overlaps the pressure-side slipper cam surface as seen in the mold moving direction.

11. A method for producing a pressure plate including a body, a flange extending radially outward from an outer circumferential edge of the body, a plurality of pressure-side fitting teeth projecting from a front surface of the flange, holding output-side rotating plates, and being arranged in a circumferential direction, a cylindrical portion provided in the body and housing an output shaft, a body-side recessed portion in a back surface of the body, and a rib connecting the cylindrical portion and the flange to each other, the method comprising:

preparing a mold including a fixed mold and a movable mold capable of approaching or separating from the fixed mold;

causing the movable mold to approach the fixed mold to close the mold;

filling a molding space formed by the movable mold and the fixed mold with a metal material;

cooling and solidifying the metal material to form the pressure plate by molding and then separating the movable mold from the fixed mold to open the mold; and pushing a core pin against the rib on the back surface of the body of the pressure plate fixed to the movable mold to detach the pressure plate from the movable mold.

* * * * *